US010924936B2

(12) United States Patent
Furuichi

(10) Patent No.: US 10,924,936 B2
(45) Date of Patent: Feb. 16, 2021

(54) APPARATUS, METHOD, AND PROGRAM FOR EXCHANGING INFORMATION BETWEEN A PLURALITY OF WIRELESS SYSTEMS

(71) Applicant: Sony Corporation, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/188,297

(22) Filed: Nov. 13, 2018

(65) Prior Publication Data

US 2019/0082327 A1 Mar. 14, 2019

Related U.S. Application Data

(63) Continuation of application No. 15/556,176, filed as application No. PCT/JP2016/001903 on Apr. 5, 2016.

(30) Foreign Application Priority Data

May 8, 2015 (JP) ................. 2015-095816

(51) Int. Cl.
H04W 16/14 (2009.01)
H04N 21/4363 (2011.01)
(Continued)

(52) U.S. Cl.
CPC ...... *H04W 16/14* (2013.01); *H04N 21/43637* (2013.01); *H04W 64/006* (2013.01);
(Continued)

(58) Field of Classification Search
CPC ... H04W 16/14; H04W 40/248; H04W 40/10; H04W 56/00; H04W 84/18; H04W 8/005;
(Continued)

(56) References Cited

U.S. PATENT DOCUMENTS

2012/0108179 A1 5/2012 Kasslin et al.
2012/0057533 A1 8/2012 Junell et al.
(Continued)

FOREIGN PATENT DOCUMENTS

JP 2012-160794 A 8/2012
JP 2013-537013 A 9/2013
(Continued)

OTHER PUBLICATIONS

Singapore Written Opinion dated May 30, 2018 in Application No. 11201708685Y (English only), 6 pages.
(Continued)

*Primary Examiner* — Kwasi Karikari
(74) *Attorney, Agent, or Firm* — Xsensus, LLP

(57) ABSTRACT

There is provided an apparatus that acquires information indicating a result of detection of a communication node managed by a second frequency usage control system; and notifies the second frequency usage control system of first sharable information generated from first frequency usage information related to a first communication node managed by a first frequency usage control system. The first sharable information being held by a first database included in the first frequency usage control system.

20 Claims, 30 Drawing Sheets

(51) Int. Cl.
*H04W 64/00* (2009.01)
*H04N 21/643* (2011.01)
*H04W 72/08* (2009.01)
*H04W 52/24* (2009.01)
*H04W 72/04* (2009.01)

(52) U.S. Cl.
CPC ........ *H04W 72/082* (2013.01); *H04N 21/643* (2013.01); *H04W 52/243* (2013.01); *H04W 72/0453* (2013.01)

(58) Field of Classification Search
CPC ........... H04W 72/0453; H04W 72/082; H04W 72/1215; H04W 72/10; H04W 72/1226; H04W 72/0426; H04W 72/048; H04W 12/02; H04W 16/10; H04W 28/08; H04W 24/10; H04W 48/08; H04W 52/243
See application file for complete search history.

(56) References Cited

U.S. PATENT DOCUMENTS

| | | |
|---|---|---|
| 2013/0155995 A1 | 6/2013 | Jo et al. |
| 2013/0155998 A1 | 6/2013 | Jo et al. |
| 2013/0157681 A1 | 6/2013 | Jo et al. |
| 2013/0157706 A1 | 6/2013 | Jo et al. |
| 2013/0295948 A1* | 11/2013 | Ye .................... H04W 72/0453 455/452.1 |
| 2014/0112325 A1* | 4/2014 | Calcev ................ H04W 48/16 370/338 |
| 2014/0038657 A1 | 6/2014 | Jo et al. |
| 2015/0237550 A1 | 8/2015 | Krisnaswamy |
| 2016/0135053 A1* | 5/2016 | Lee .................... H04L 63/0407 726/7 |
| 2016/0150416 A1 | 5/2016 | Ye et al. |

FOREIGN PATENT DOCUMENTS

| | | |
|---|---|---|
| WO | 2012/030169 A2 | 8/2012 |
| WO | 2012/132804 A1 | 10/2012 |

OTHER PUBLICATIONS

International Search Report dated Jul. 18, 2016, in PCT/JP2016/001903 filed Apr. 5, 2016.

Office Action issued in Japanese Application 2018-242331 dated Oct. 23, 2019.

* cited by examiner

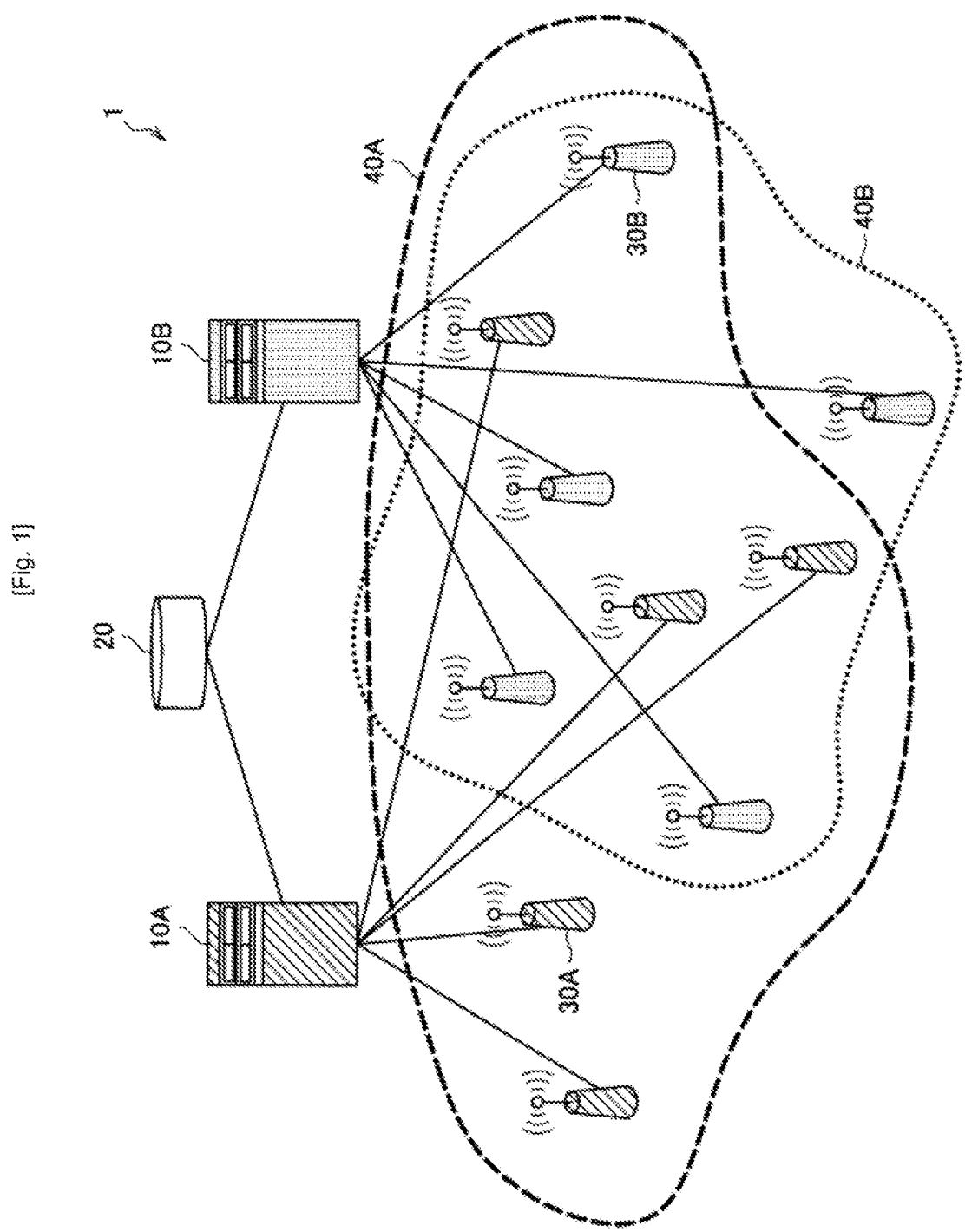
[Fig. 1]

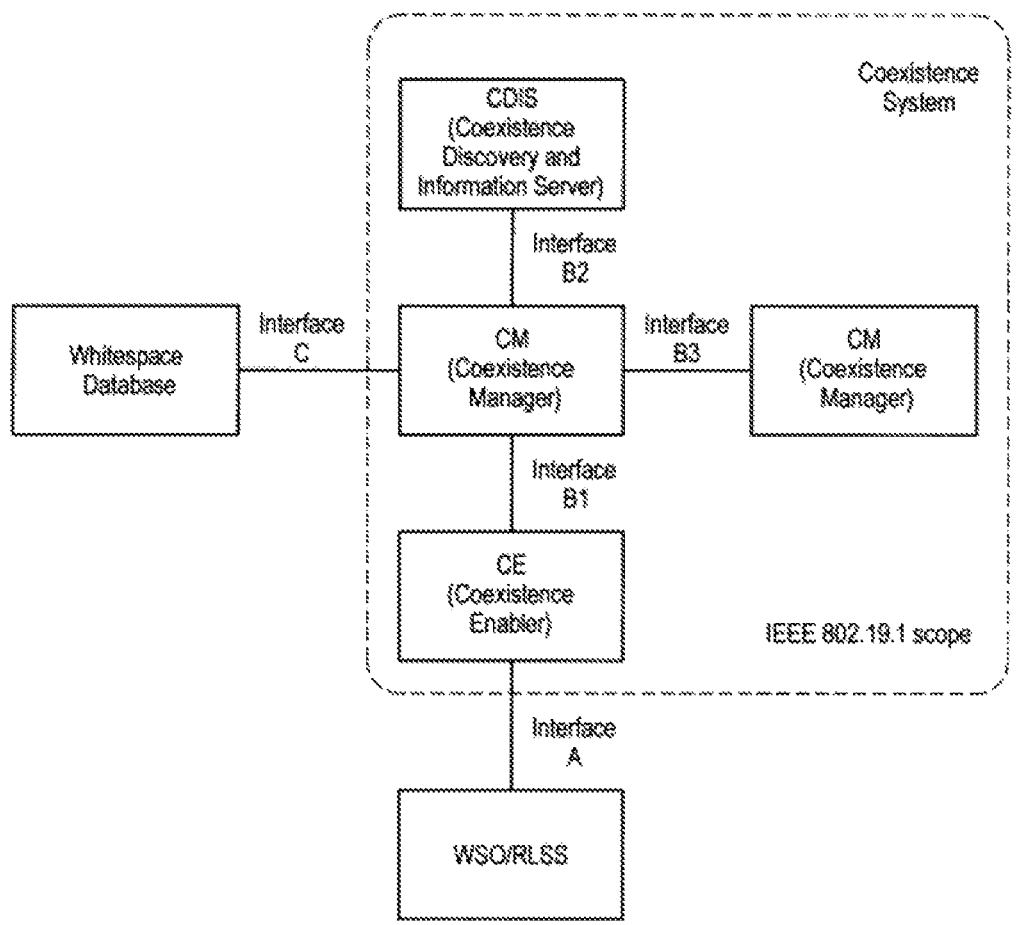
[Fig. 2]

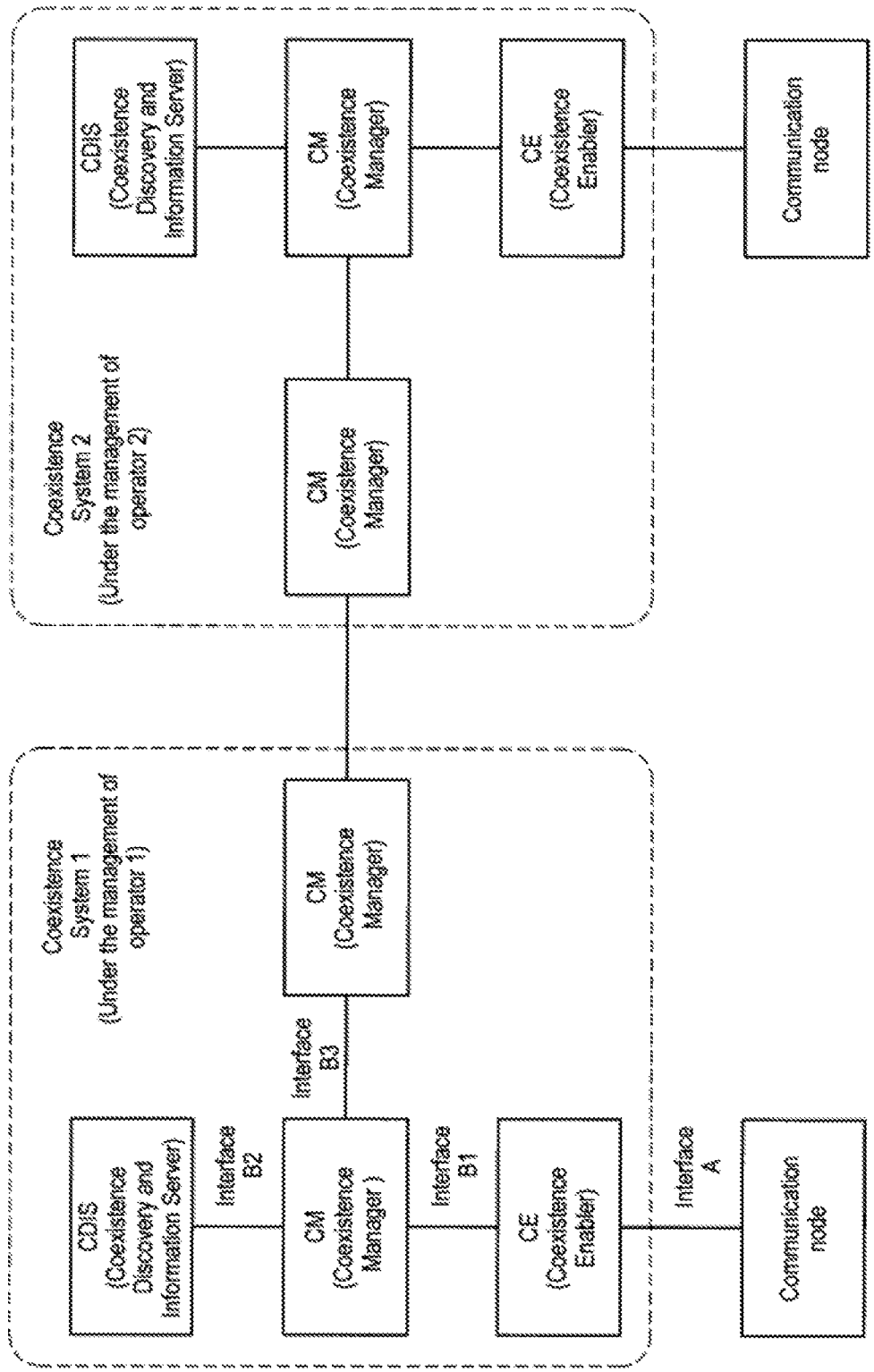
[Fig. 3]

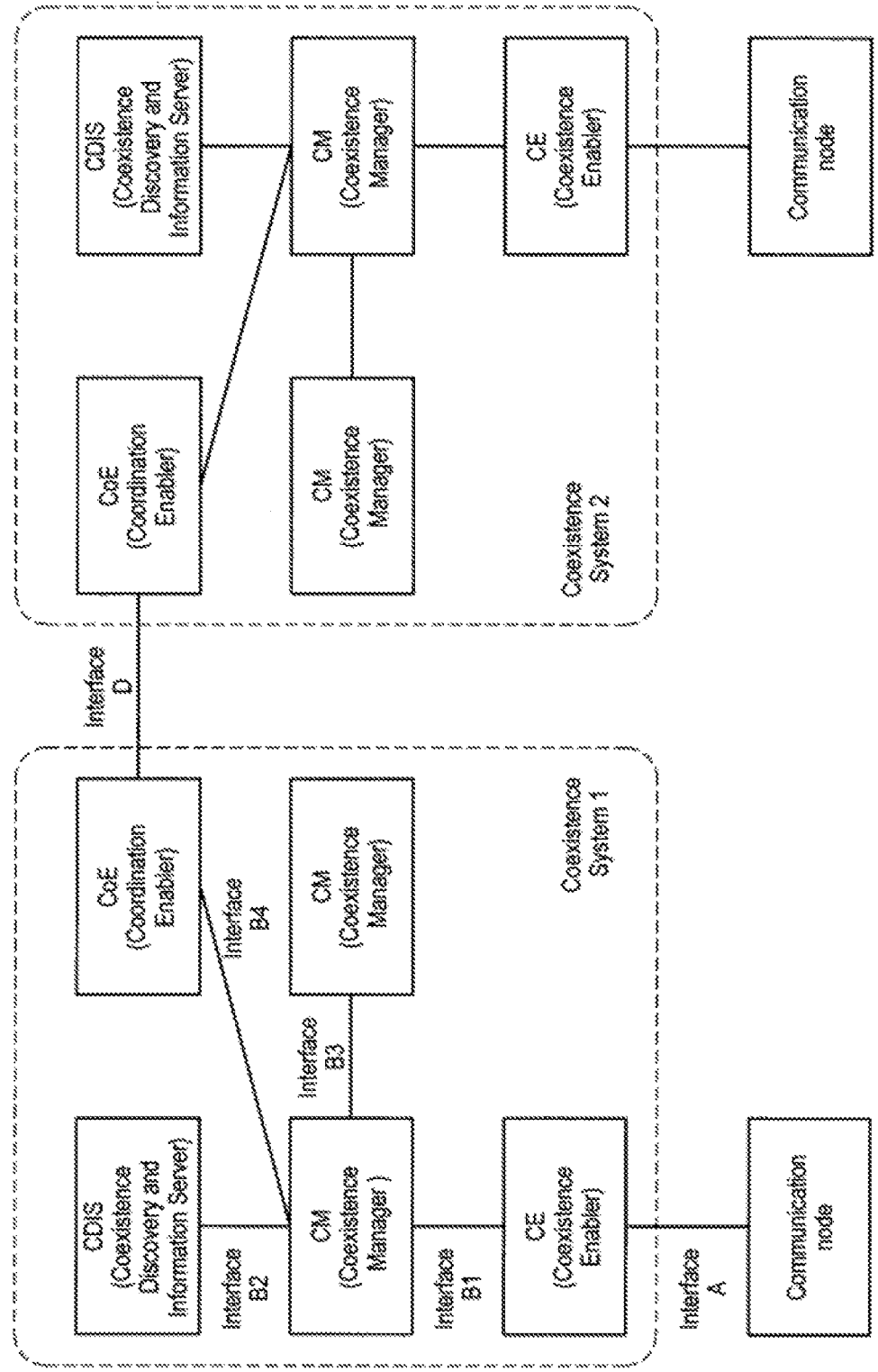
[Fig. 4]

[Fig. 5]
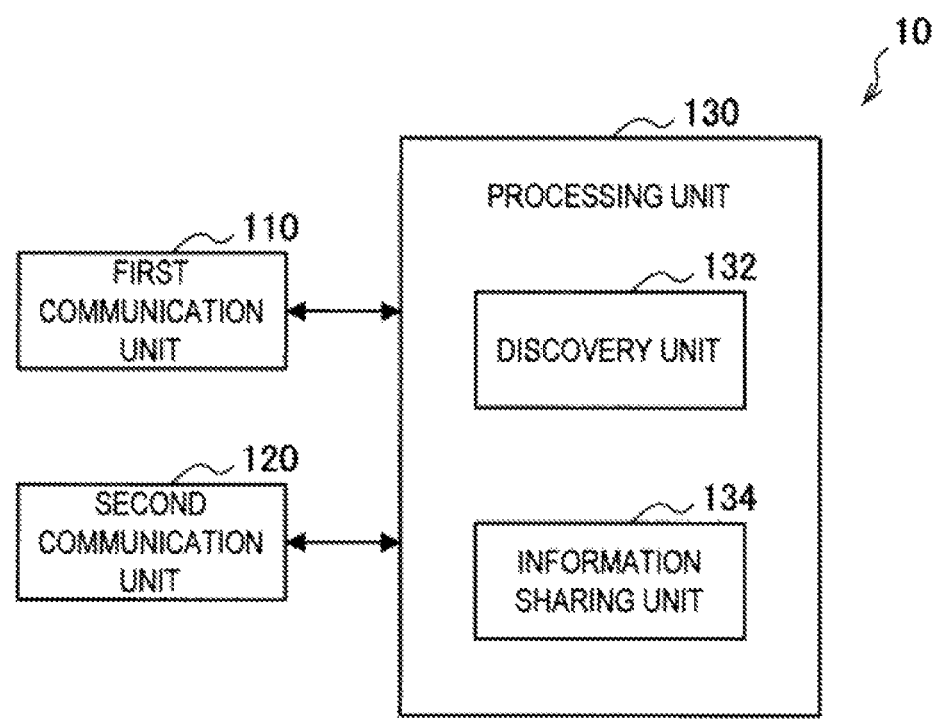

[Fig. 6]
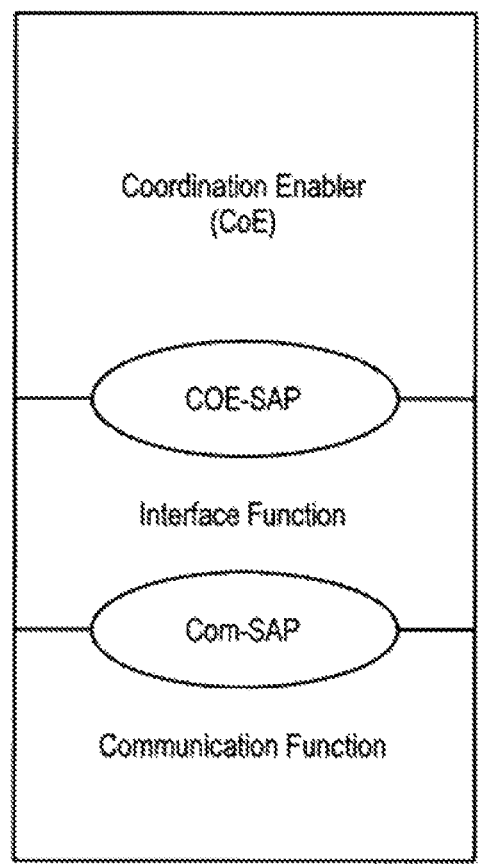

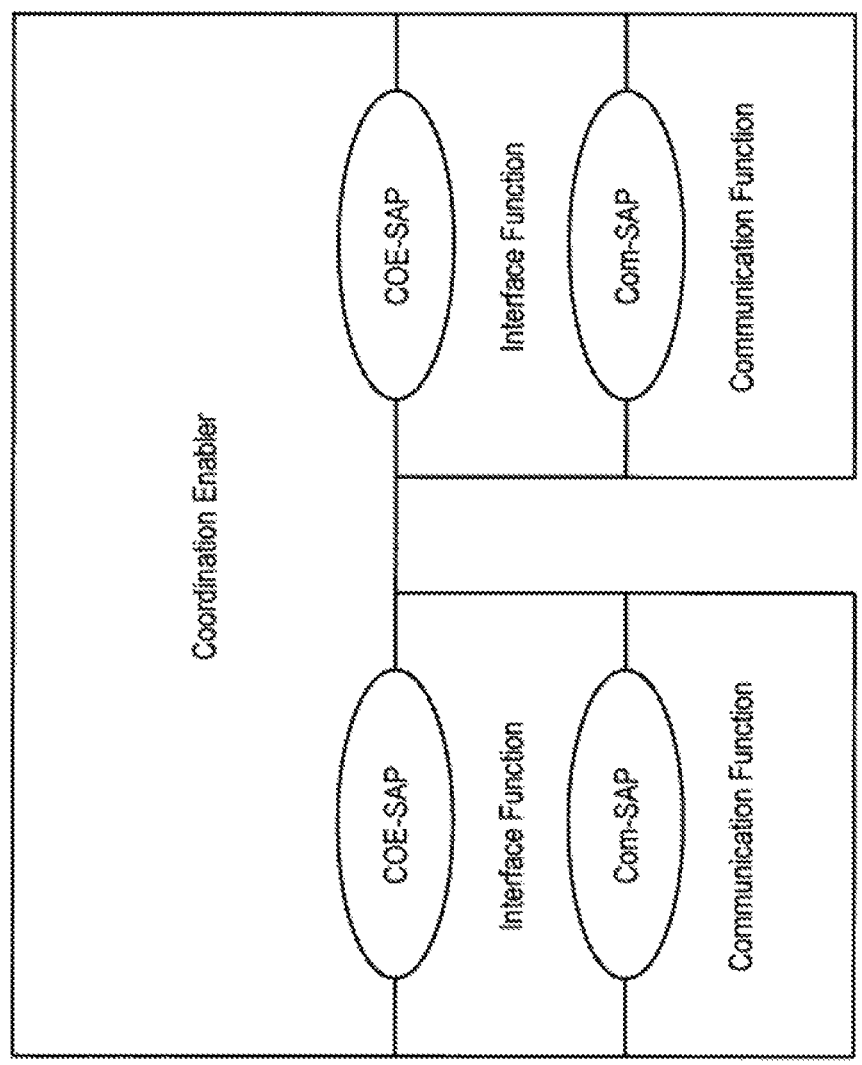
[Fig. 7]

[Fig. 8]
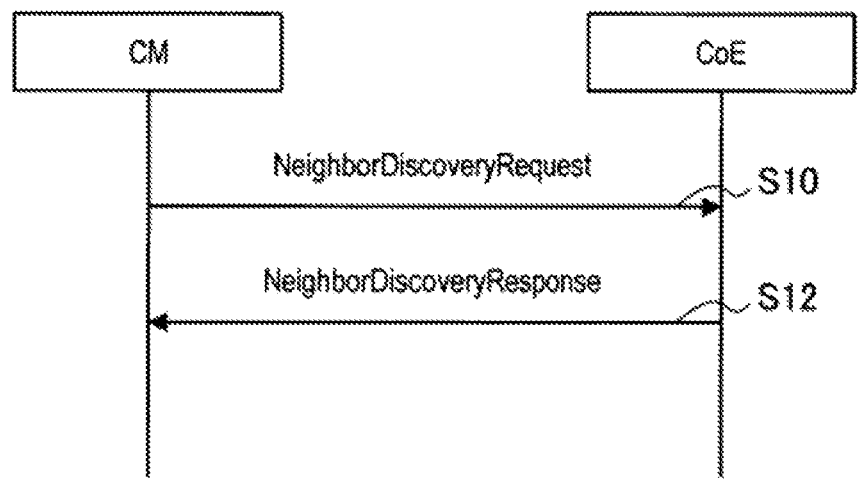
[Fig. 9]
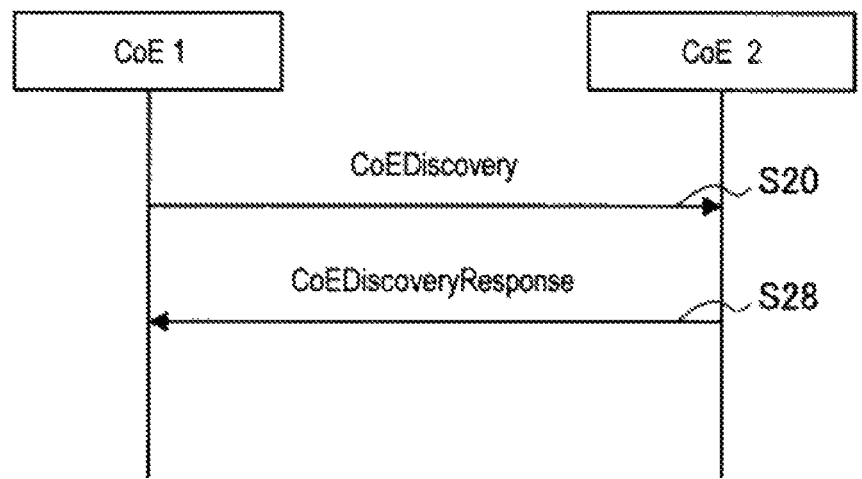

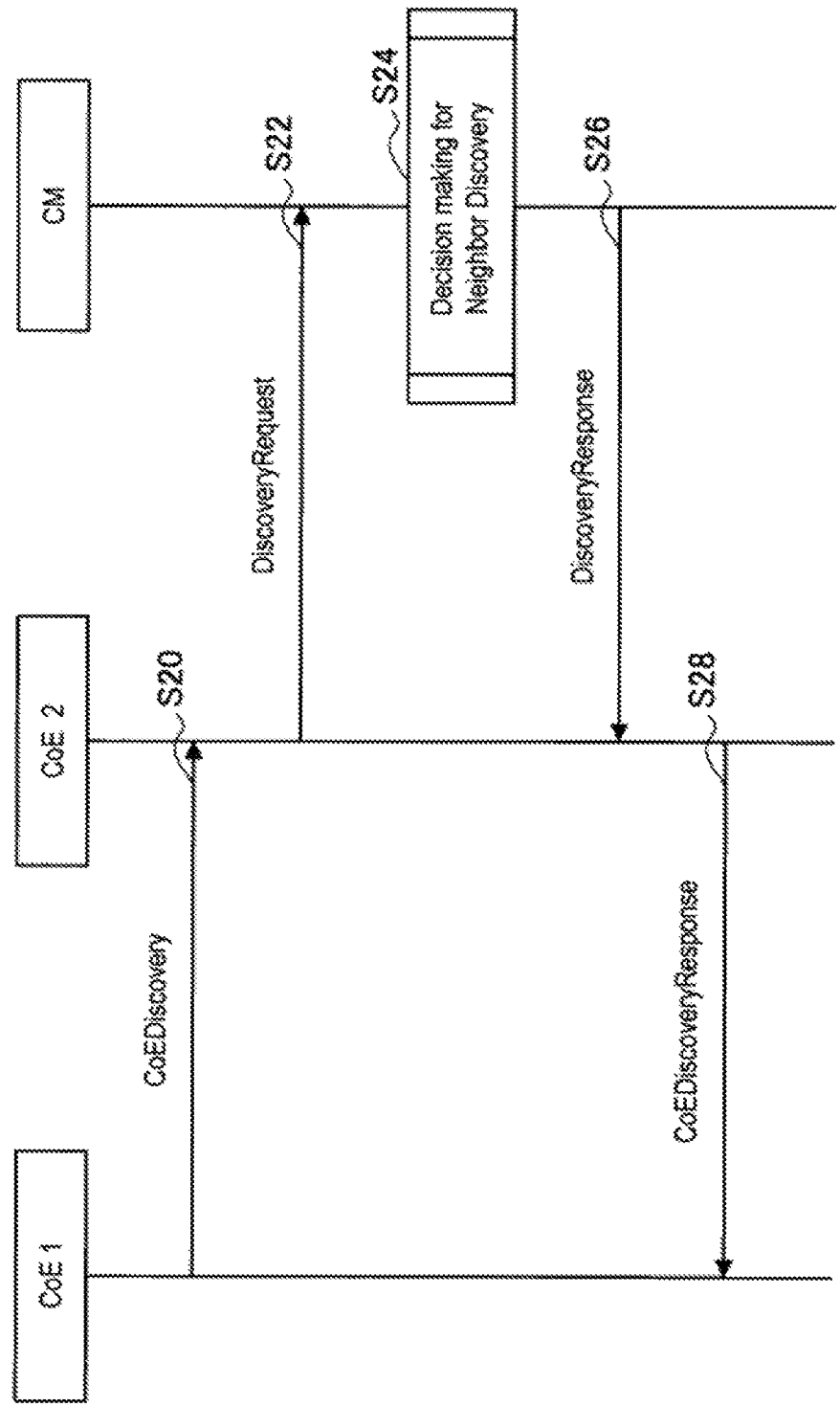

[Fig. 11]
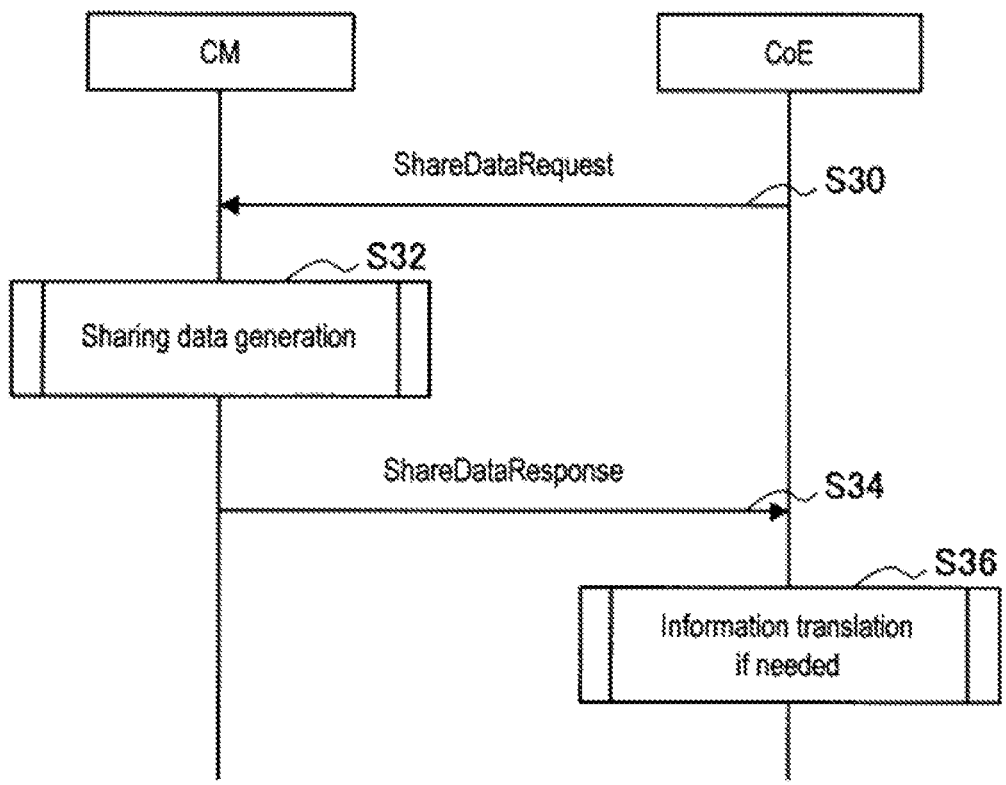
[Fig. 12]
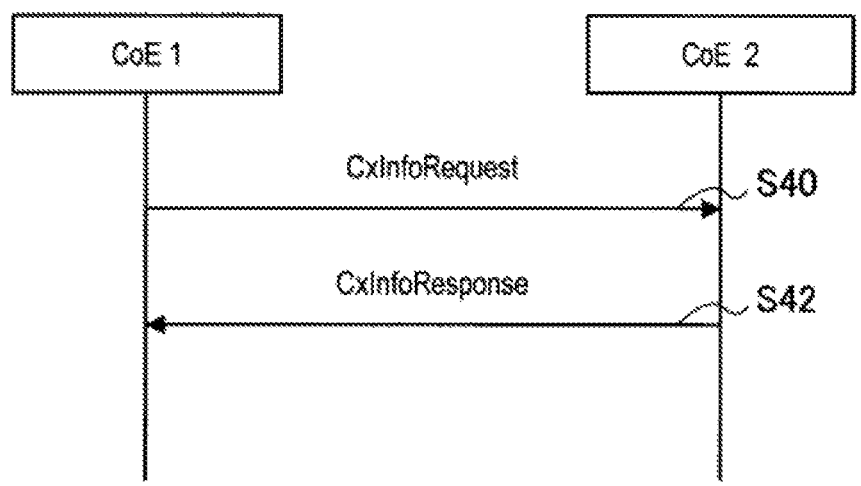

[Fig. 13]
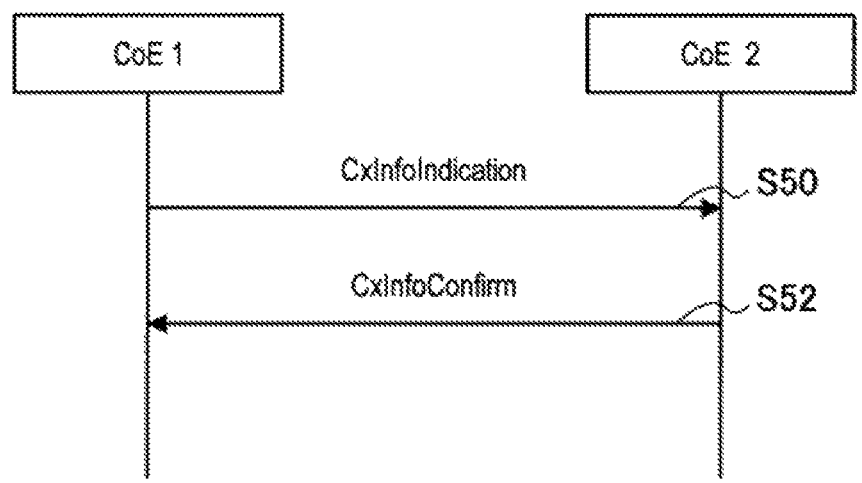
[Fig. 14]
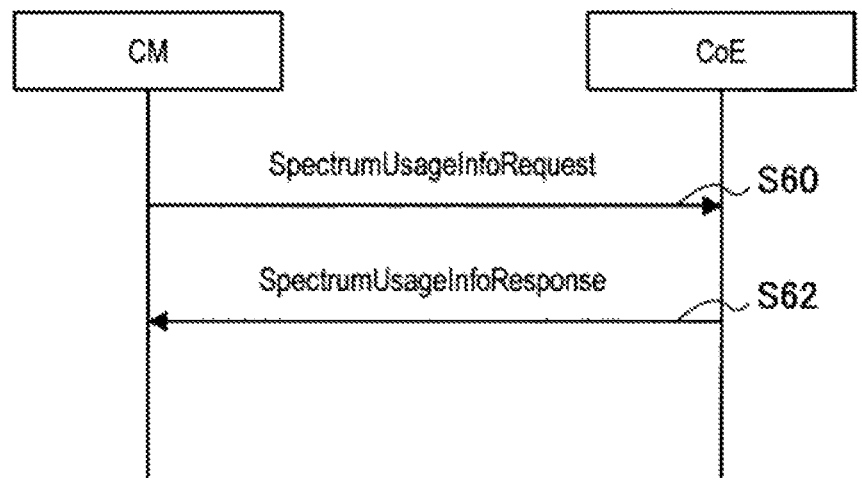

[Fig. 15]
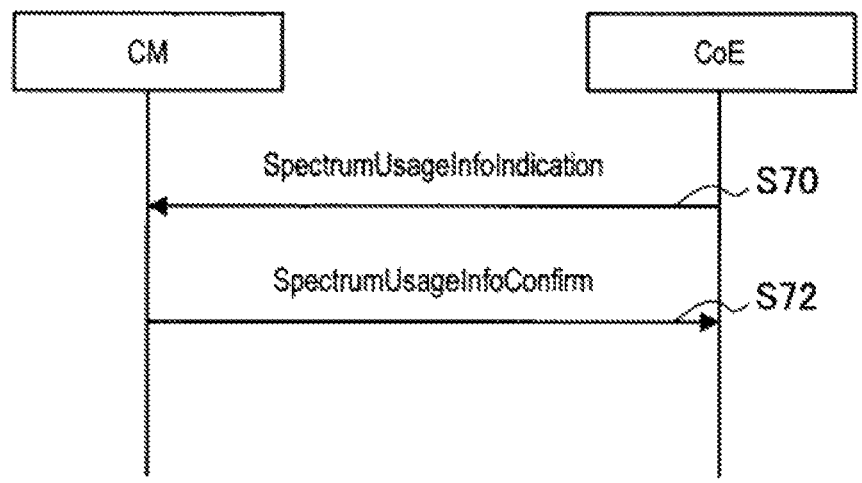

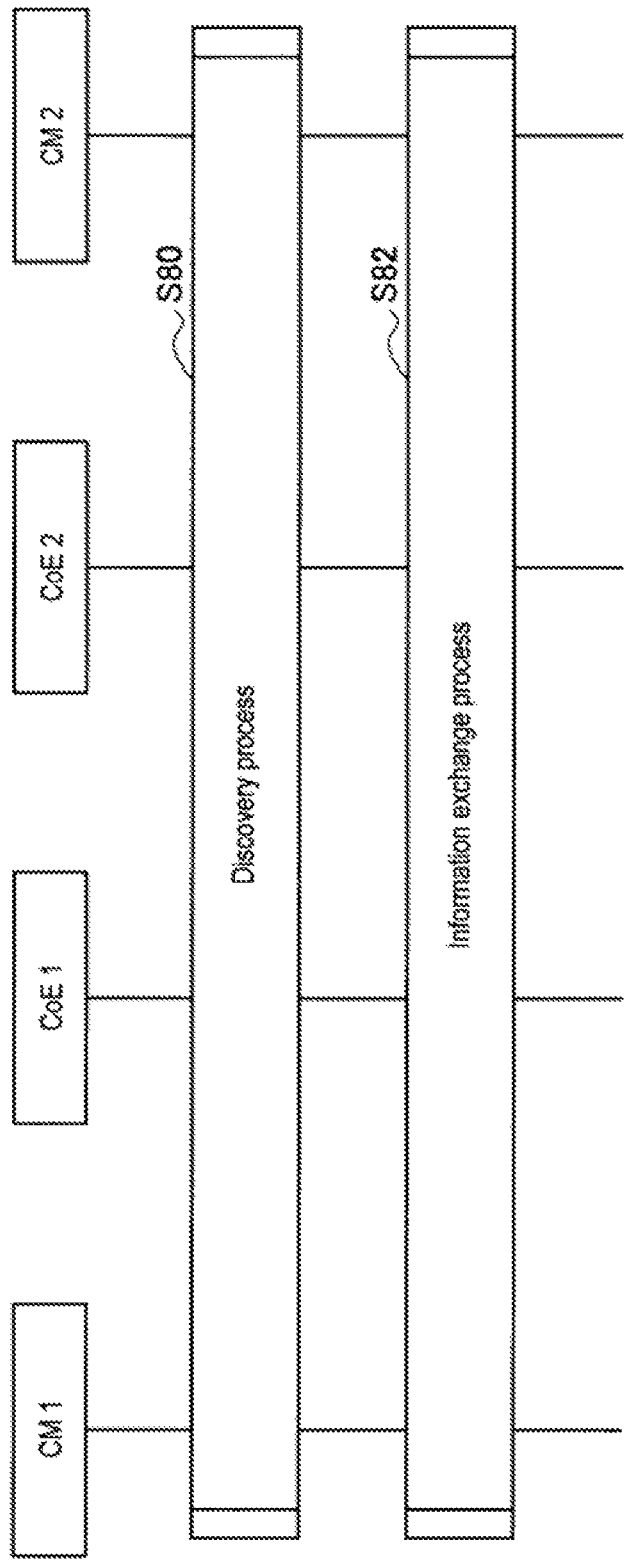
[Fig. 16]

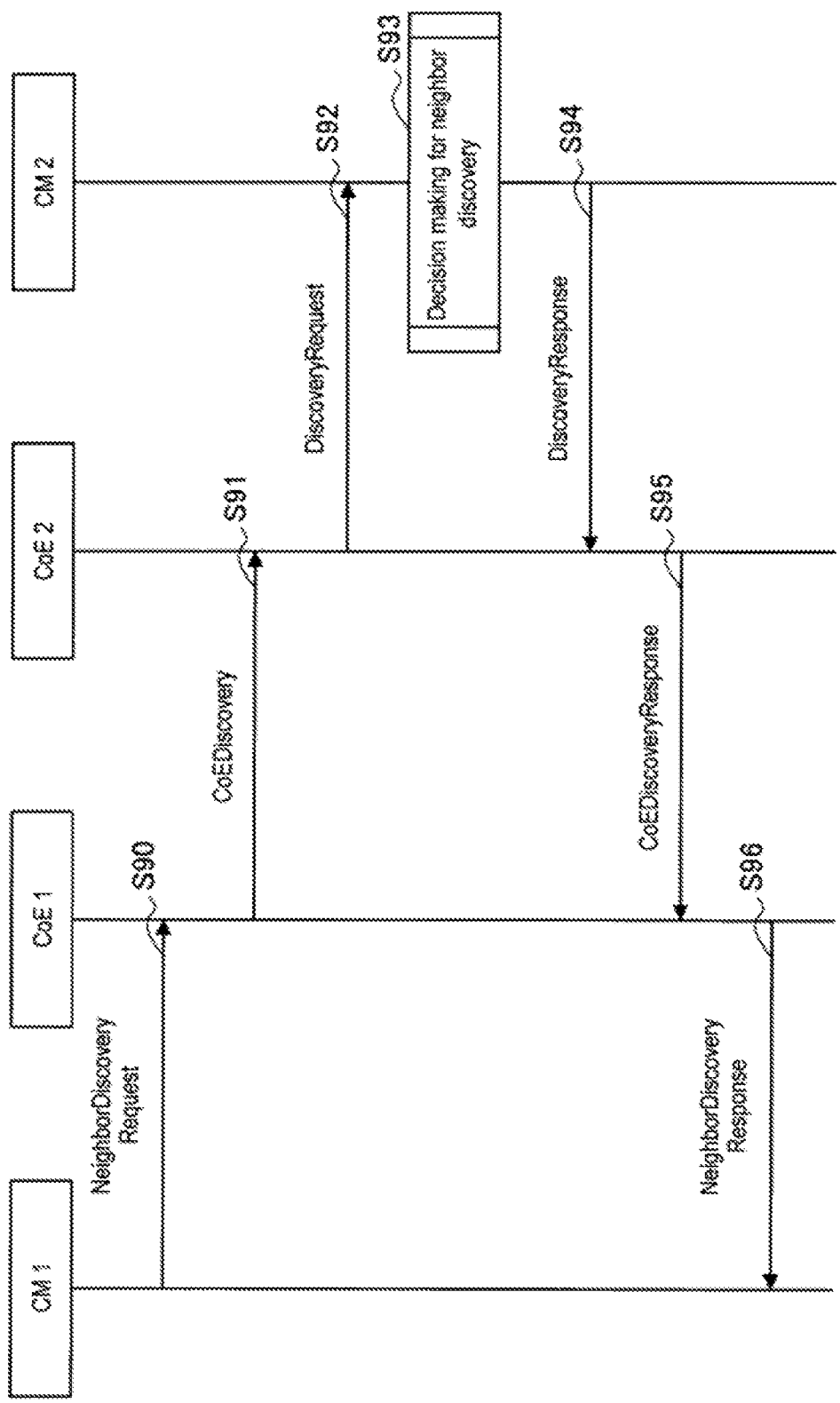

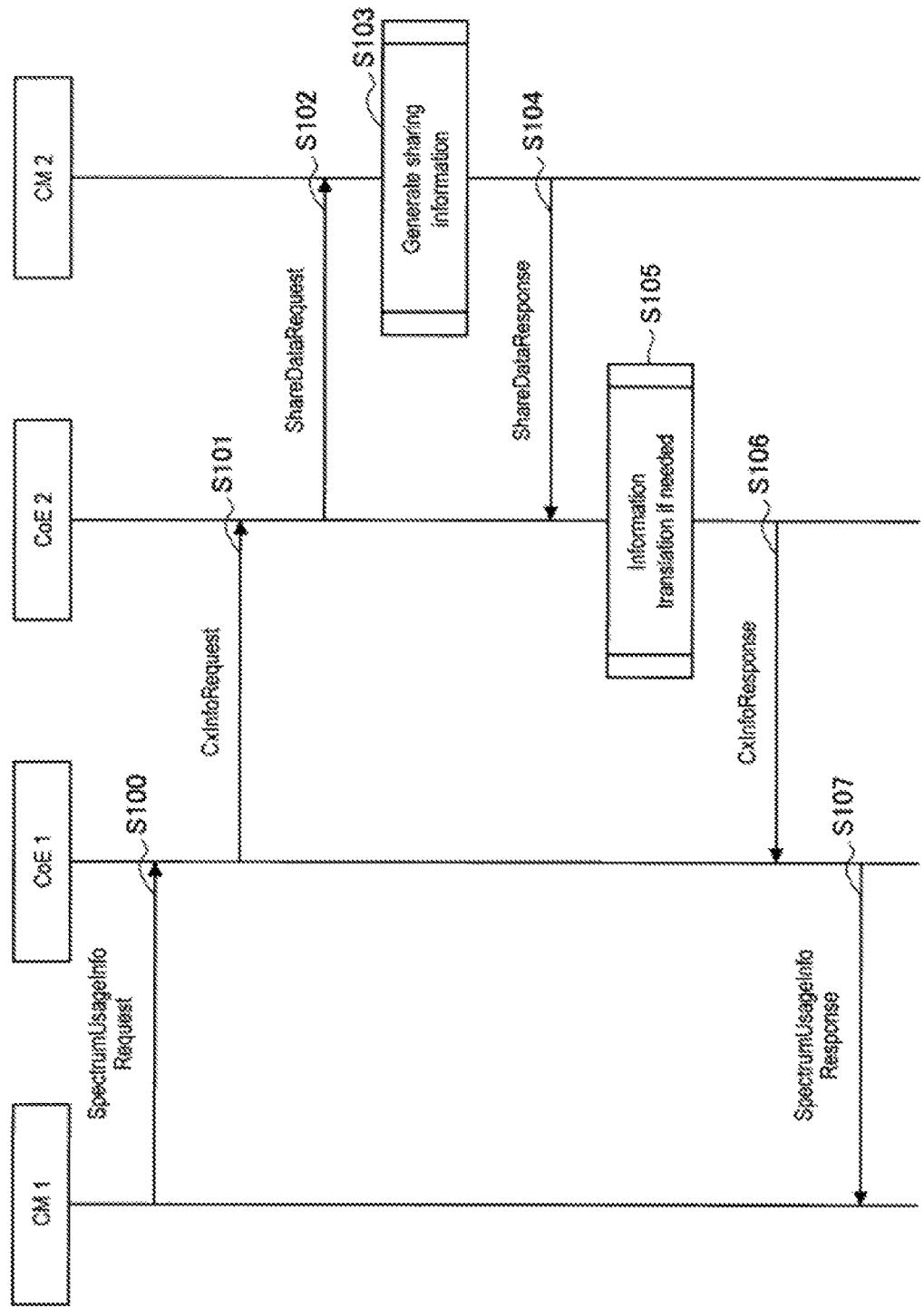
[Fig. 18]

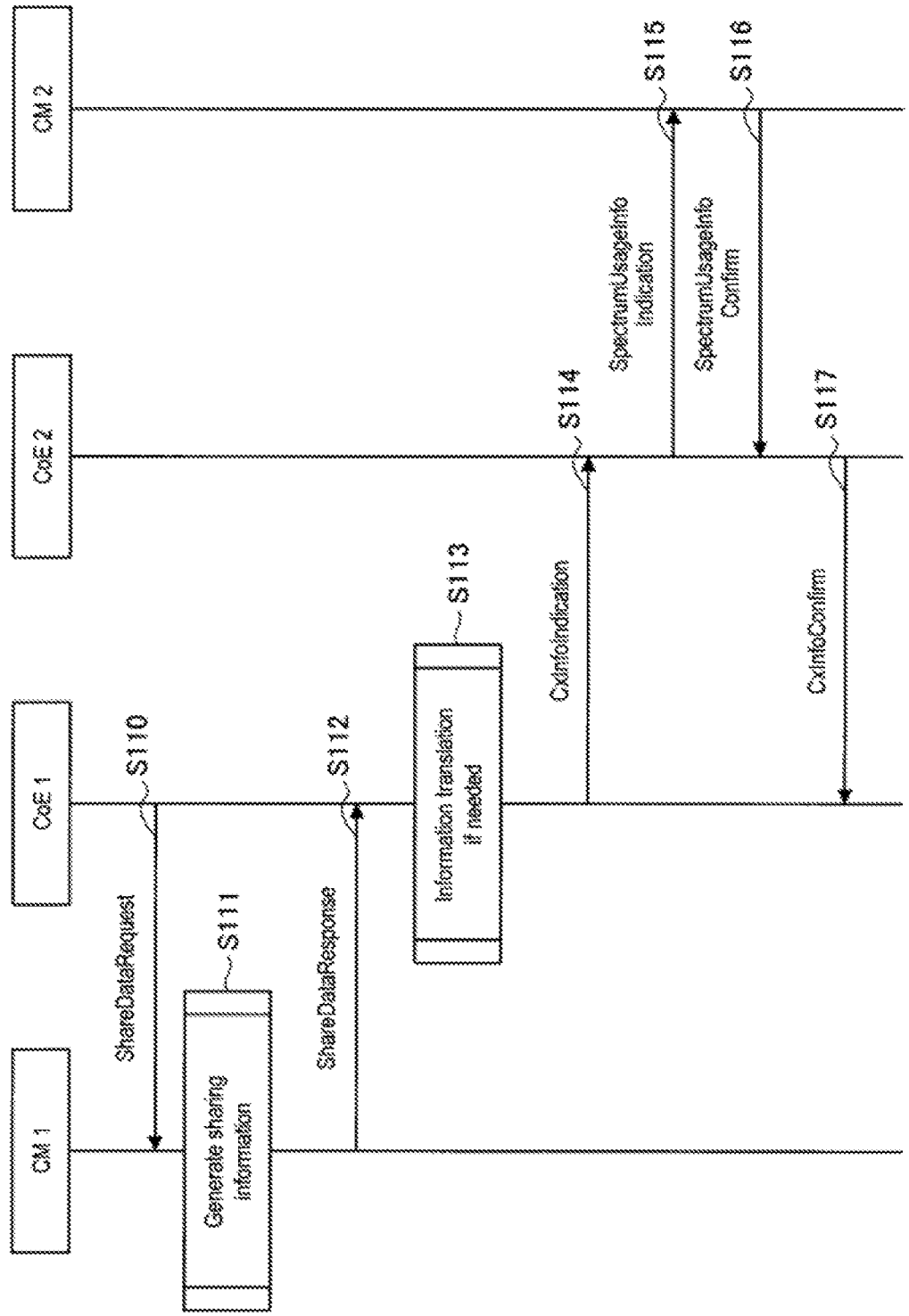
[Fig. 19]

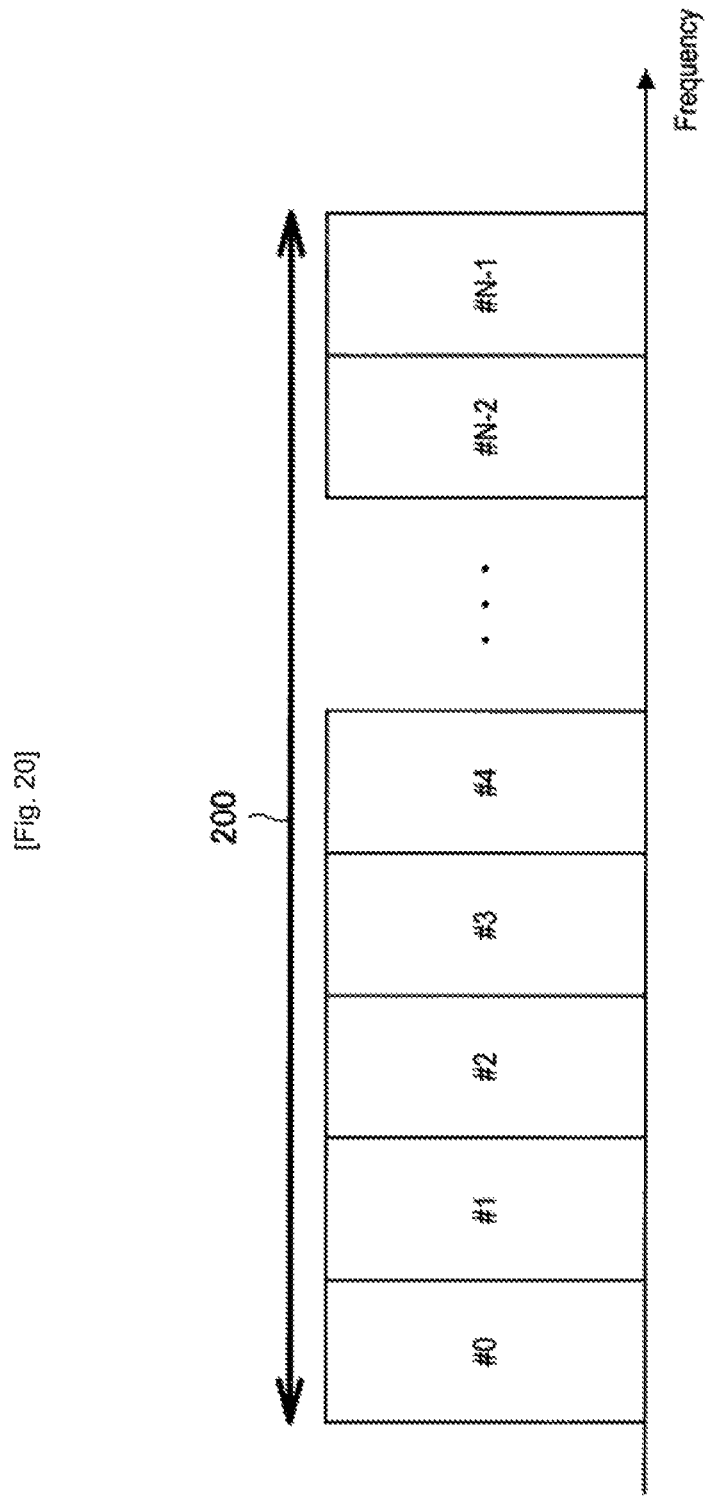

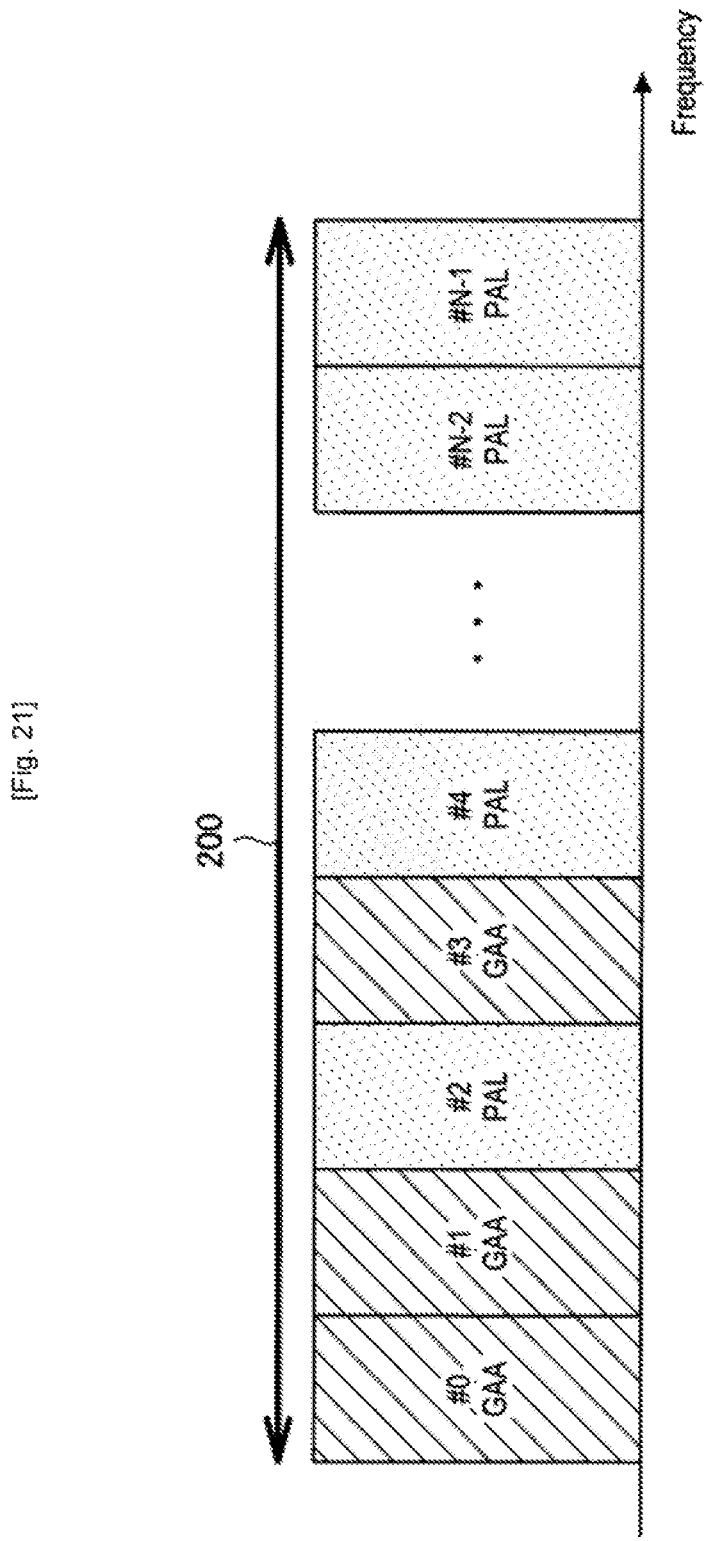
[Fig. 21]

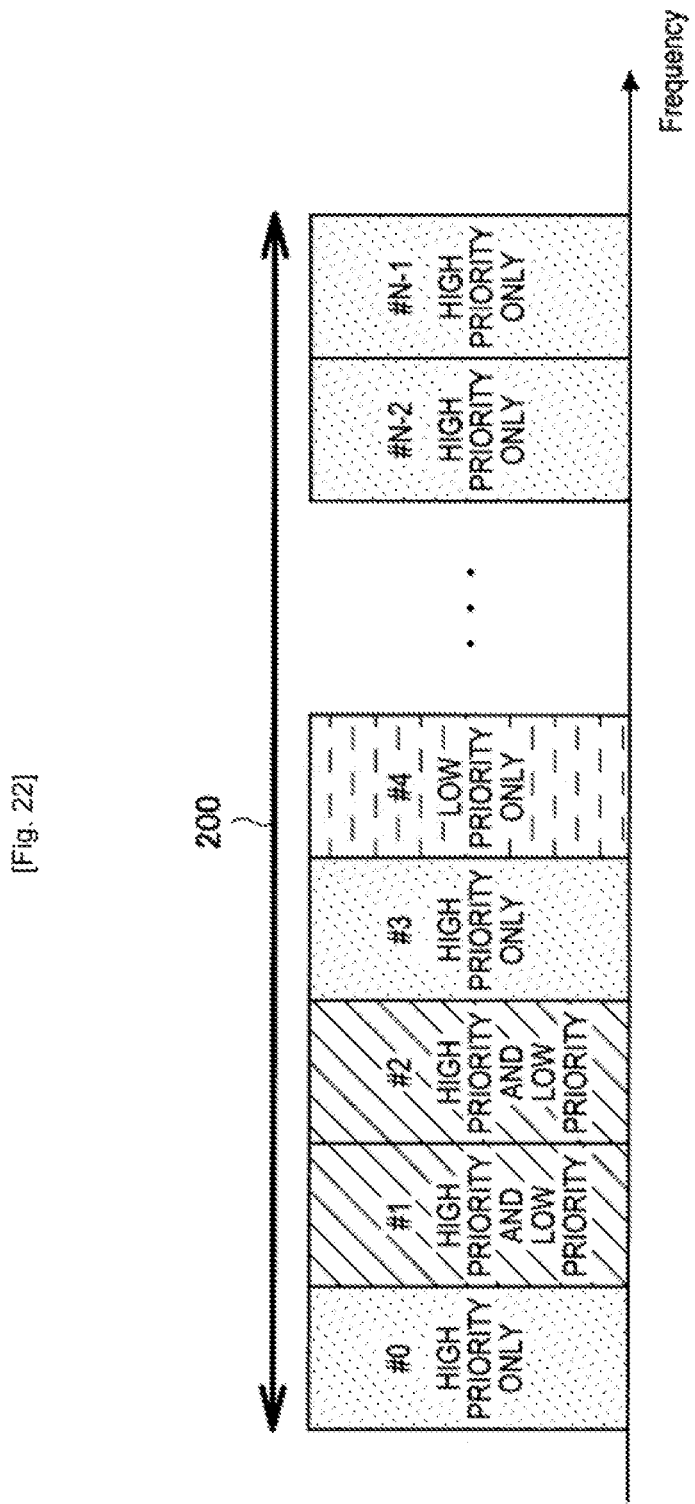
[Fig. 22]

[Fig. 23]
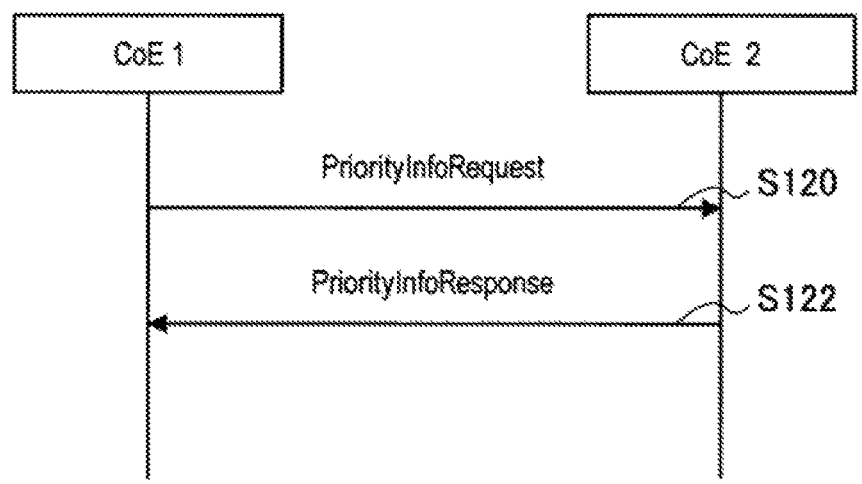
[Fig. 24]
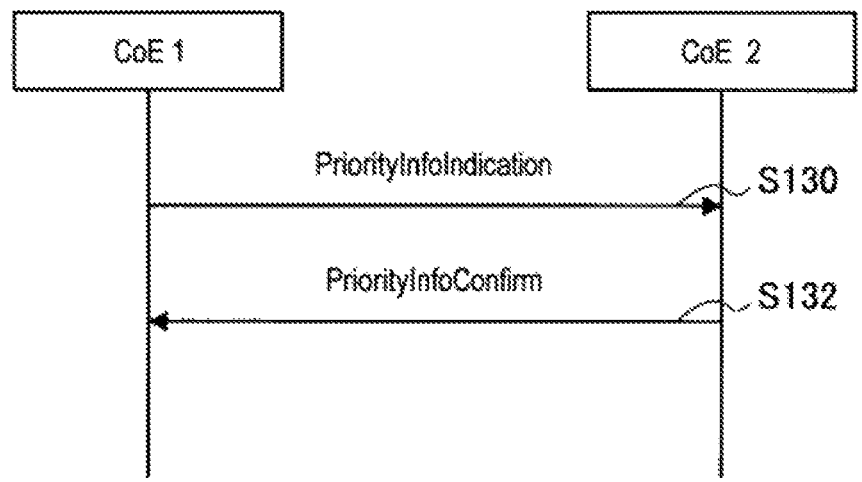

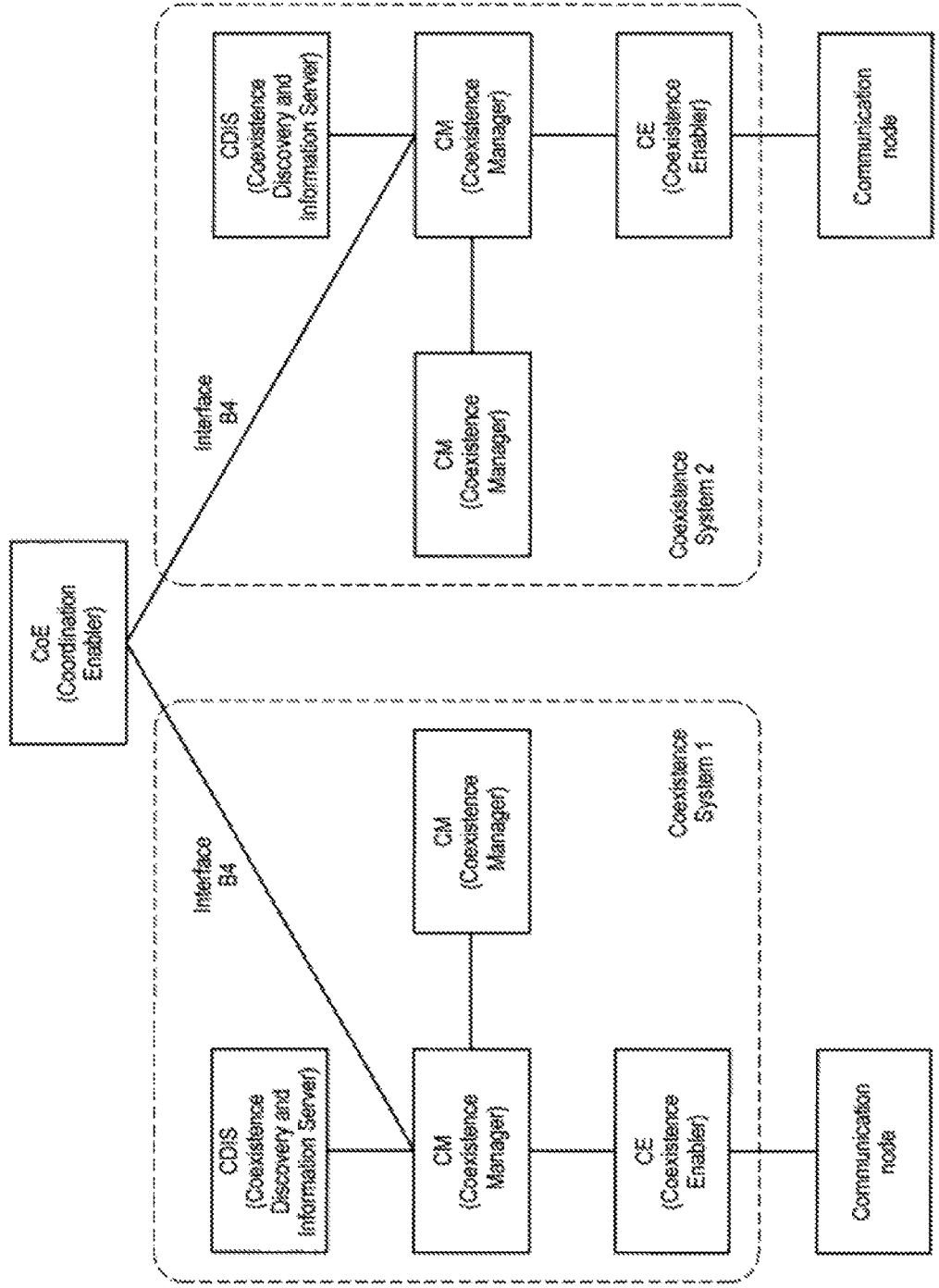

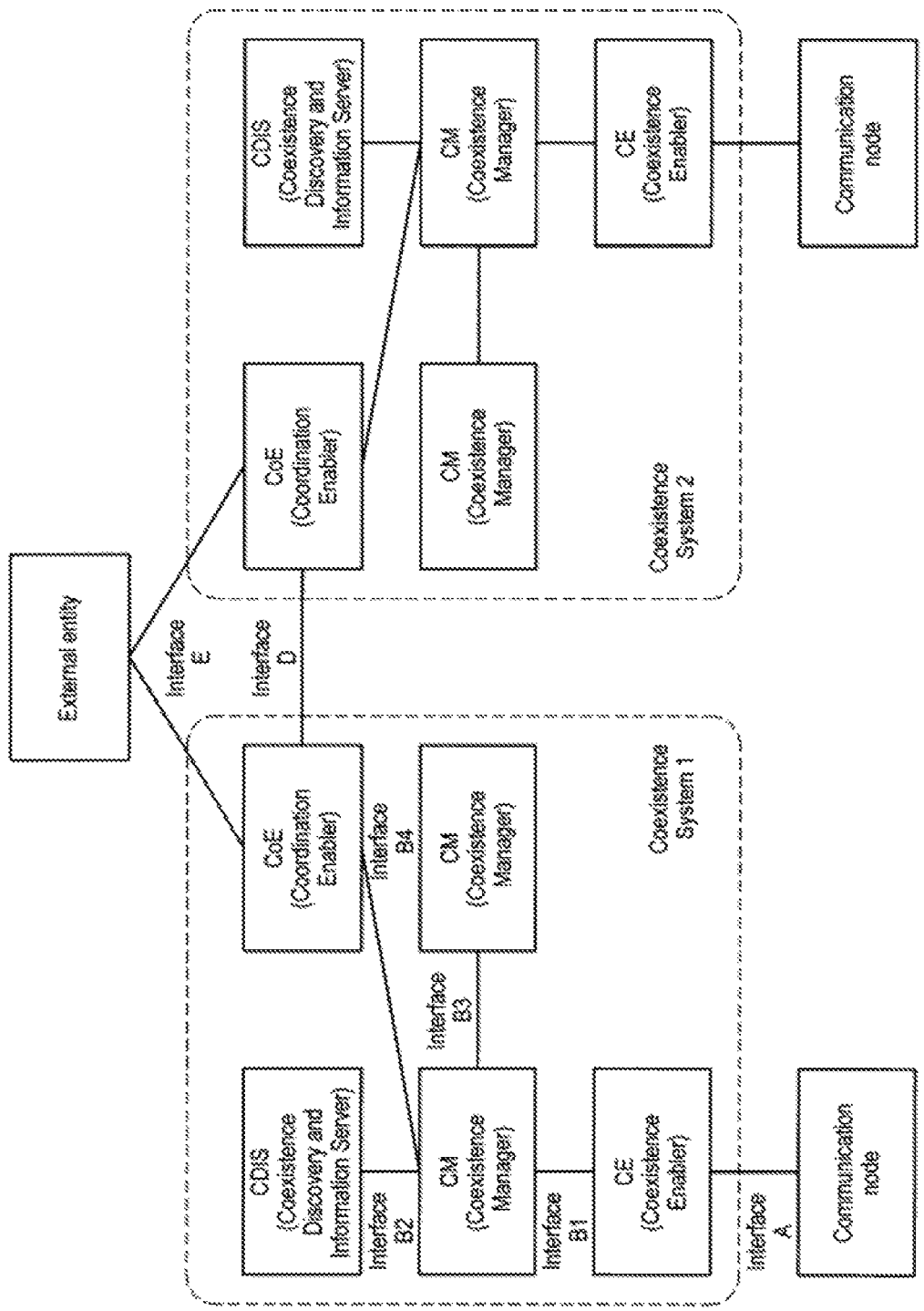
[Fig. 26]

[Fig. 27]
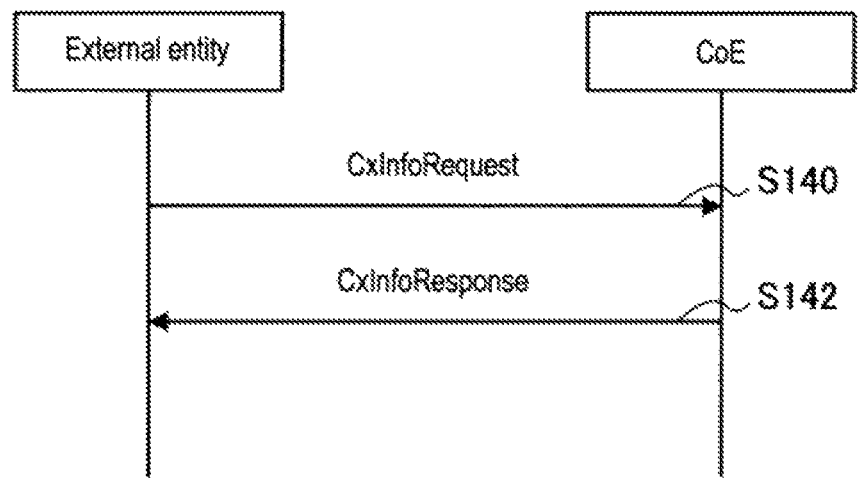
[Fig. 28]
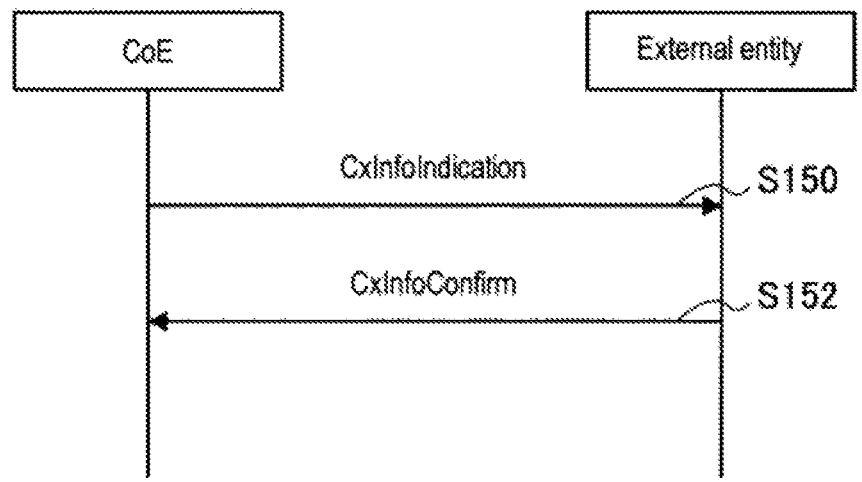

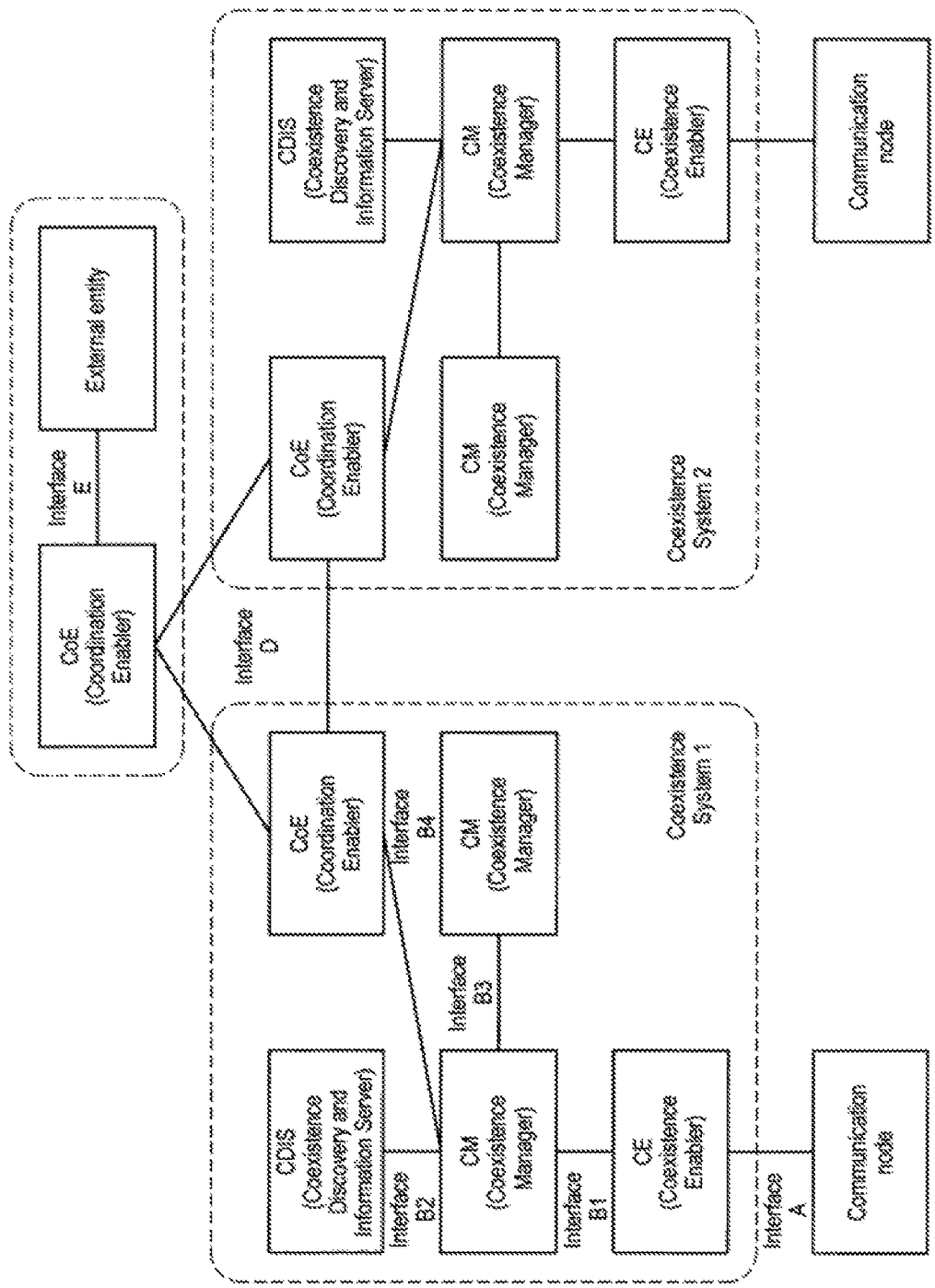

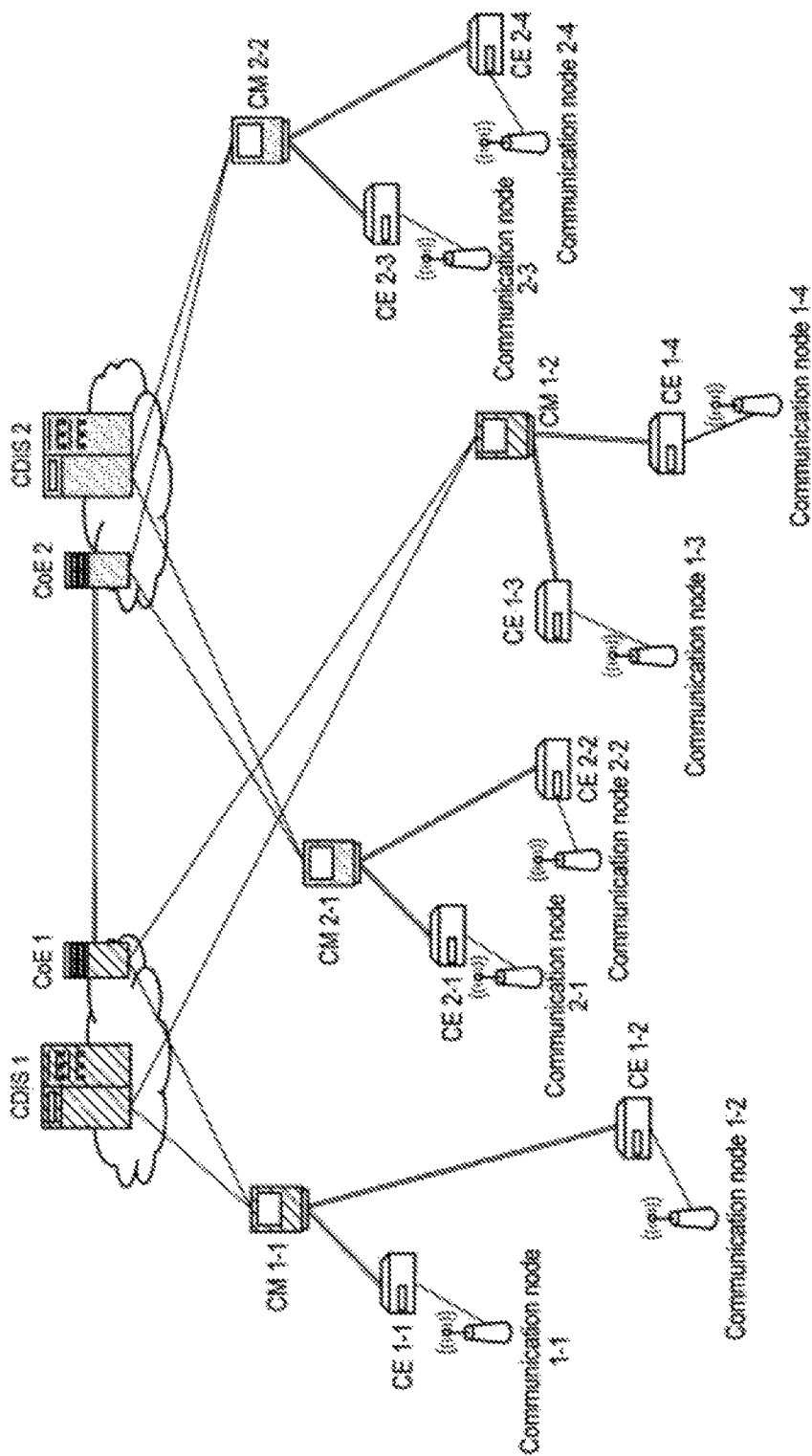
[Fig. 30]

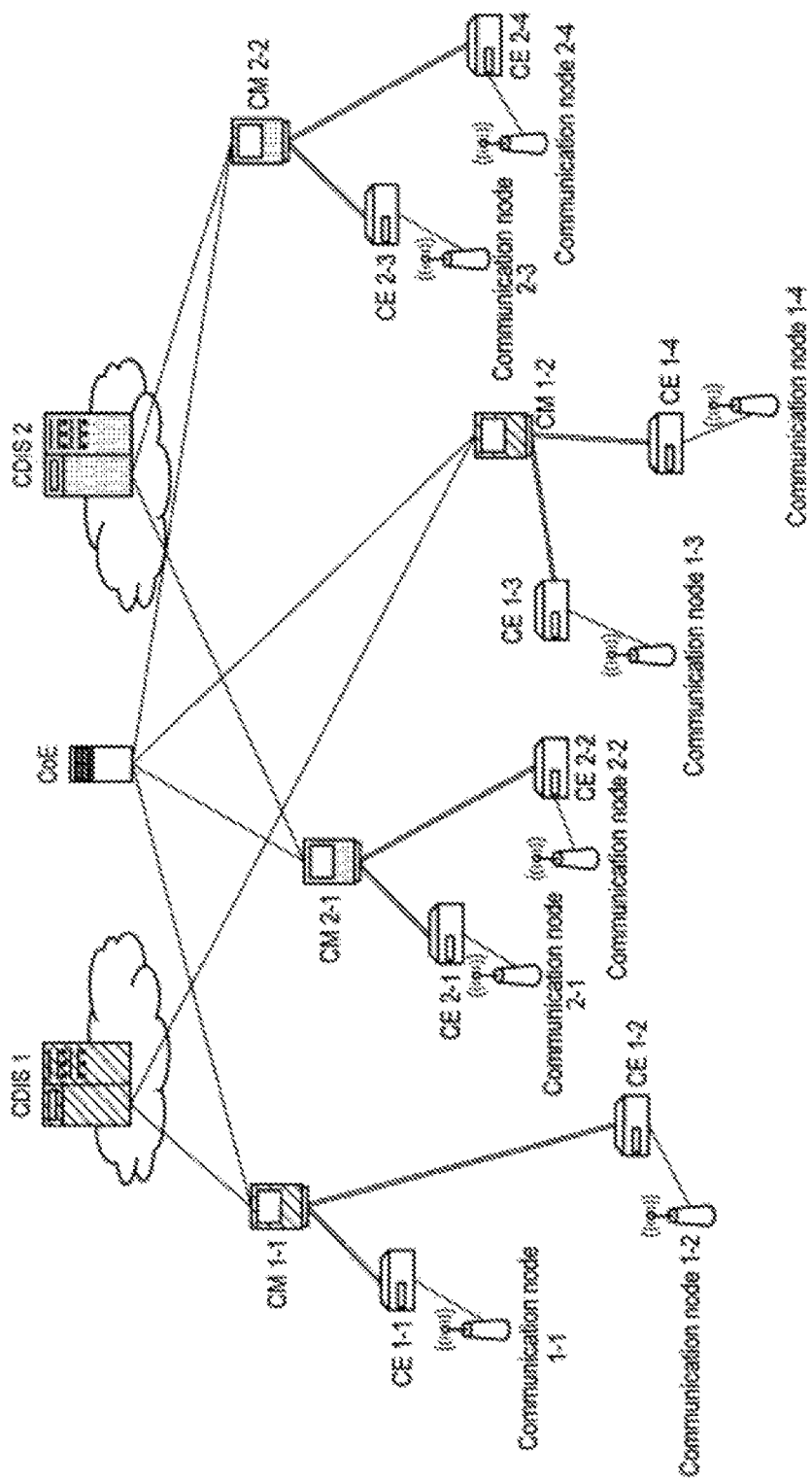
[Fig. 31]

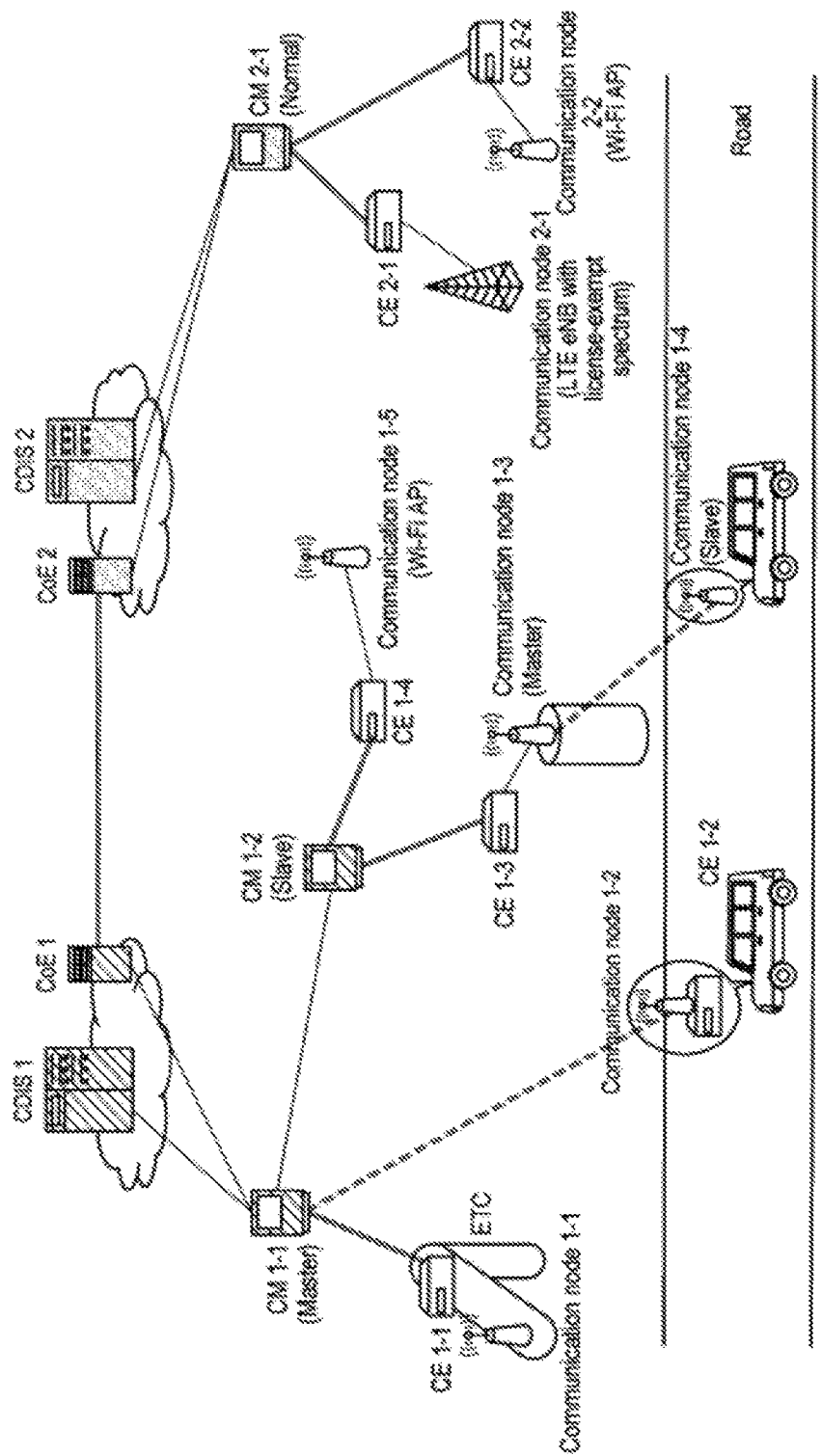
[Fig. 32]

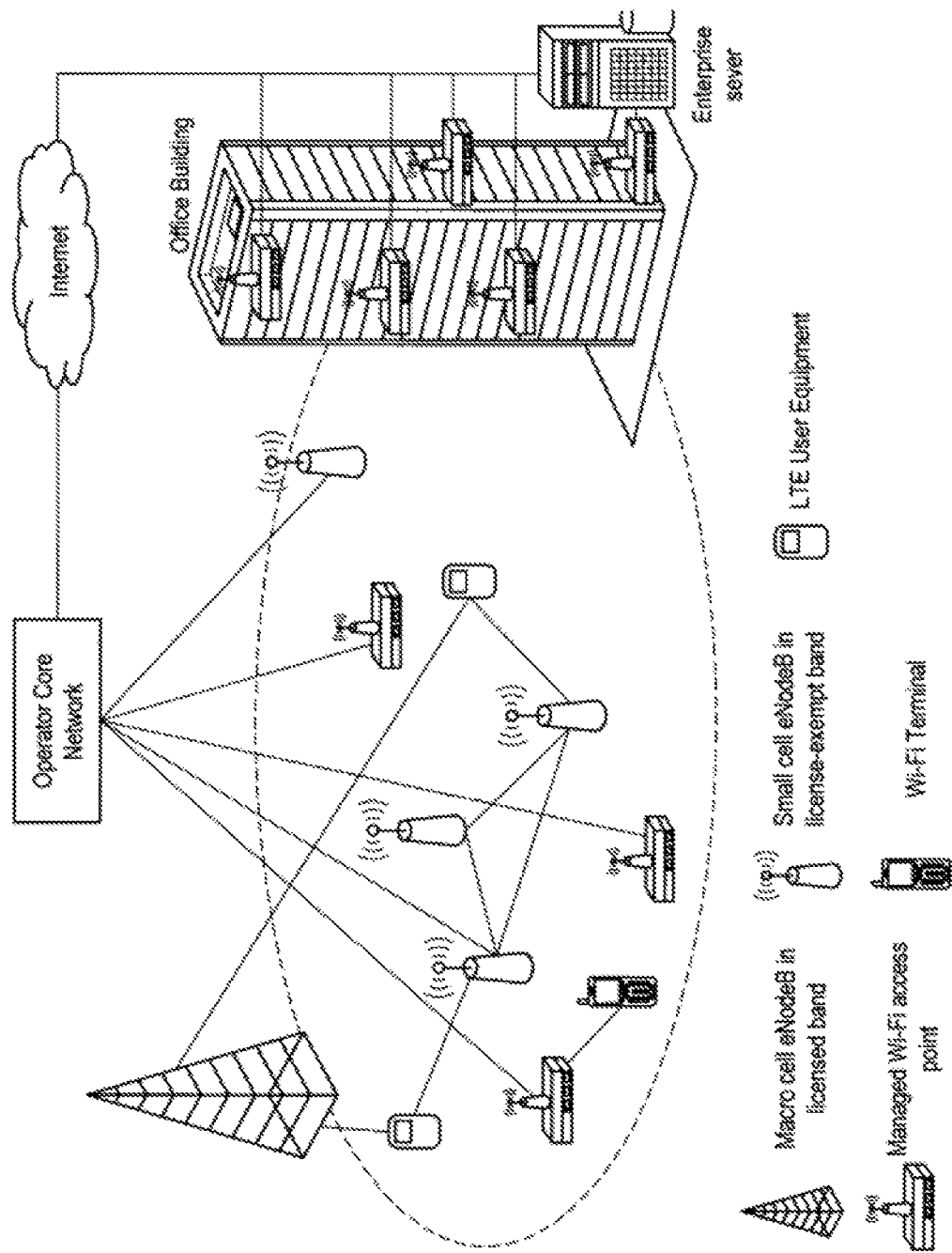
[Fig. 33]

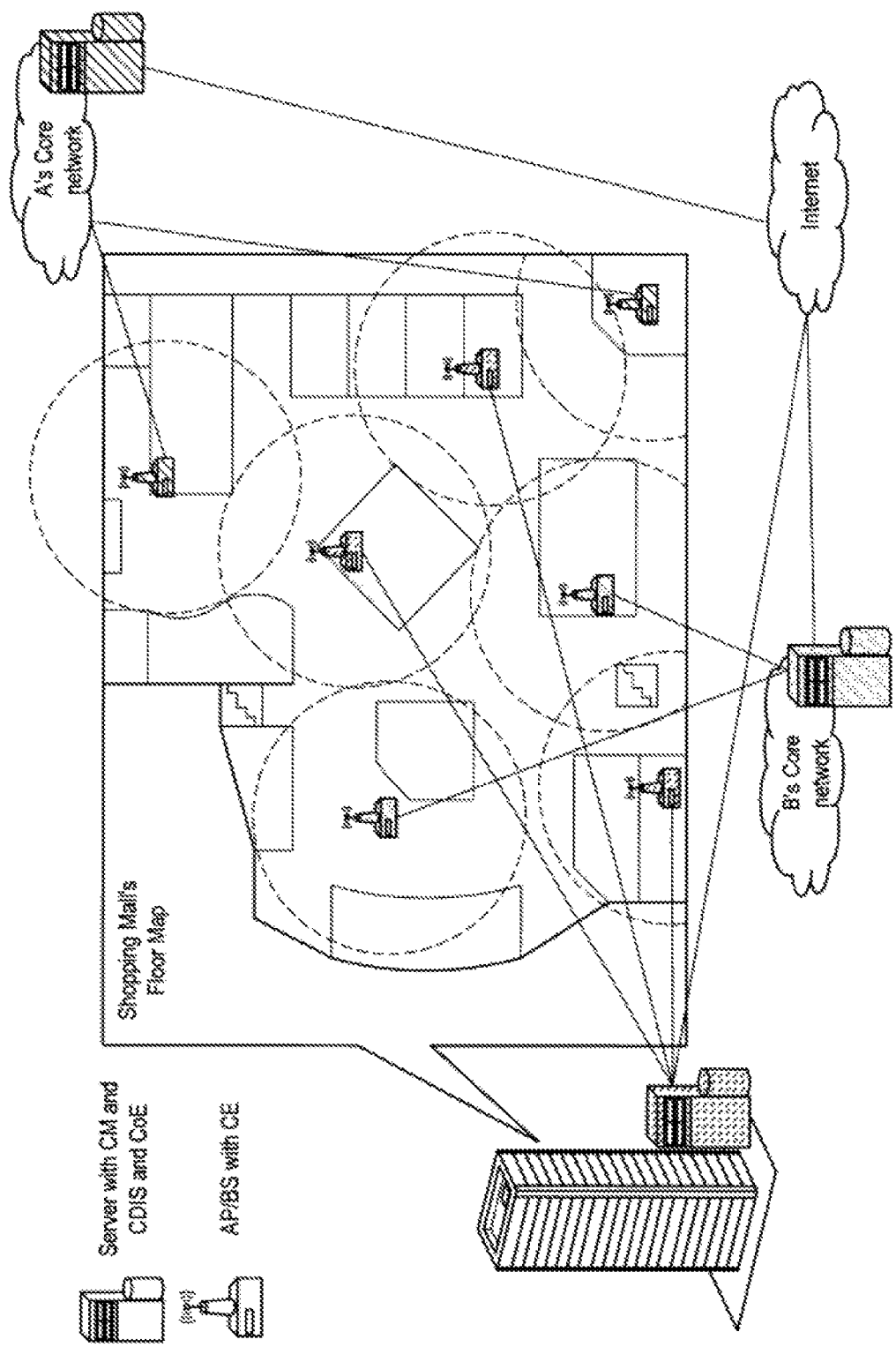

[Fig. 35]
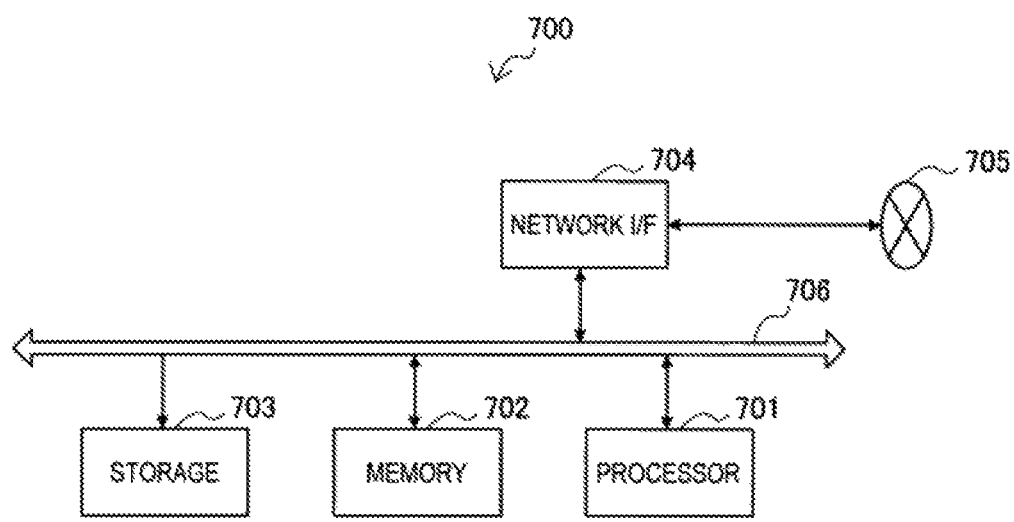

APPARATUS, METHOD, AND PROGRAM FOR EXCHANGING INFORMATION BETWEEN A PLURALITY OF WIRELESS SYSTEMS

CROSS REFERENCE TO RELATED APPLICATIONS

This application is a continuation of U.S. patent application Ser. No. 15/556,176, filed on Sep. 6, 2017, which is a National Stage Application based on PCT/JP2016/001903, filed on Apr. 5, 2016, and claims the priority of Japanese Patent Application No. 2015-095816, filed on May 8, 2015, which is incorporated herein by reference in its entirety.

TECHNICAL FIELD

The present disclosure relates to apparatuses, methods, and programs.

BACKGROUND ART

Among measures to alleviate a future shortage of frequency resources is the secondary usage of frequencies, which has been being vigorously studied. The secondary usage of frequencies means that all or a portion of frequency channels allocated to one system with a higher priority are secondarily used by another system. In general, a system to which frequency channels are allocated with a higher priority is called a primary system while another system that secondarily uses the frequency channels is called a secondary system.

TV white spaces are an example of frequency channels that are expected to be secondarily used. TV white spaces refer to frequency channels that are allocated to a TV broadcasting system serving as a primary system, but are not locally used by the TV broadcasting system. By permitting a secondary system to use TV white spaces, efficient utilization of frequency resources may be achieved. There are a plurality of standards for wireless access schemes in the physical layer (PHY) and the MAC layer that allow for the secondary usage of TV white spaces, such as IEEE 802.22, IEEE 802.11af, European Computer Manufacturer Association (ECMA)-392 (CogNea), and the like.

The IEEE 802.19 working group has focused on smooth coexistence of a plurality of secondary systems that employ different wireless access schemes. For example, in the IEEE 802.19 working group, functions for coexistence of secondary systems are divided into three functional entities, i.e., coexistence managers (CM), coexistence enablers (CE), and coexistence discovery and information servers (CDIS). CMs are a functional entity that mainly makes a decision for coexistence. CEs are a functional entity that serves as an interface for mediating transmission of commands or exchange of information between a CM and a secondary usage node. CDISs are a functional entity that serves as a server fore managing information of a plurality of secondary systems in a centralized manner. CDISs also have the neighbor discovery function of discovering neighboring secondary systems that may interfere with each other.

For such functional entities, PTL 1 described below discloses a technique of avoiding concentration of loads on a CDIS that occurs due to neighbor discovery which is performed by a plurality of functional entities in cooperation with each other.

CITATION LIST

Patent Literature

[PTL 1]
WO 2012/132804

SUMMARY

Technical Problem

However, techniques for coexistence of secondary systems proposed in PTL 1 and the like have been quite recently developed, and are fir from satisfactory for achieving smooth coexistence in various situations. For example, no satisfactory technique has been proposed for exchanging information between a plurality of secondary systems for the purpose of coexistence of the secondary systems.

With the above in mind, the present disclosure proposes a novel and improved apparatus, method, and program capable of smoothly exchanging information between a plurality of wireless systems.

Solution to Problem

According to an embodiment of the present disclosure, there is provided an apparatus that acquires information indicating a result of detection of a communication node managed by a second frequency usage control system; and notifies the se and frequency usage control system of first sharable information generated from first frequency usage information related to a first communication node managed by a first frequency usage control system. The first sharable information being held by a first database included in the first frequency usage control system According to an embodiment of the present disclosure, there is provided a method that includes acquiring information indicating a result of detection of a communication node managed by a second frequency usage control system; and notifying the second frequency usage control system of first sharable information generated from first frequency usage information related to a first communication node managed by a first frequency usage control system, wherein the first sharable information is held by a first database included in the first frequency usage control system.

According to an embodiment of the present disclosure, there is provided a program for causing a computer to: acquire information indicating a result of detection of a communication node managed by a second frequency usage control system; and notify the second frequency usage control system of first sharable information generated from first frequency usage information related to a first communication node managed by a first frequency usage control system, wherein the first sharable information is held by a first database included in the first frequency usage control system.

Advantageous Effects of Invention

As described above, according to an embodiment of the present disclosure, information can be smoothly exchanged between a plurality of wireless systems. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram of an overview of a communication system according to an embodiment of the present disclosure.

FIG. 2 is an explanatory diagram illustrating connections between three functional entities for assistance for coexistence.

FIG. 3 is a diagram for describing an architecture according to a comparative example.

FIG. 4 is a diagram for describing an architecture according to this embodiment.

FIG. 5 is a block diagram illustrating a configuration example of a communication control apparatus according to this embodiment.

FIG. 6 is a diagram illustrating an example of a reference model of an interface of a CoE.

FIG. 7 is a diagram illustrating an example of a reference model of an interface of a CoE.

FIG. 8 is an explanatory diagram for describing a neighbor discovery request procedure.

FIG. 9 is an explanatory diagram for describing a CoE discovery procedure.

FIG. 10 is an explanatory diagram for describing a CoE discovery procedure.

FIG. 11 is an explanatory diagram for describing a share data request procedure.

FIG. 12 is an explanatory diagram for describing an inter-CoE data exchange request procedure.

FIG. 13 is an explanatory diagram for describing an inter-CoE data indication procedure.

FIG. 14 is an explanatory diagram for describing a spectrum usage information request procedure.

FIG. 15 is an explanatory diagram for describing a spectrum usage information indication procedure.

FIG. 16 is a sequence diagram for describing an example of a general flow of a procedure according to this embodiment.

FIG. 17 is a sequence diagram for describing a flow of a discovery process according to this embodiment.

FIG. 18 is a sequence diagram for describing, an example of a flow of an information exchange process according to this embodiment.

FIG. 19 is a sequence diagram for describing an example of a flow of an information exchange process according to this embodiment.

FIG. 20 is a diagram for describing coexistence for each sub-channel of a sharing frequency band.

FIG. 21 is a diagram for describing coexistence for each sub-channel of a sharing frequency band.

FIG. 22 is a diagram for describing coexistence for each sub-channel of a sharing frequency band.

FIG. 23 is an explanatory diagram for describing an inter-CoE priority-based information request procedure.

FIG. 24 is an explanatory diagram for describing an inter-CoE priority-based information indication procedure.

FIG. 25 is a diagram for describing an architecture according to a first variation.

FIG. 26 is a diagram for describing an architecture according to a first variation.

FIG. 27 is an explanatory diagram for describing a procedure for an external entity according to this variation.

FIG. 28 is an explanatory diagram for describing a procedure for an external entity according to this variation.

FIG. 29 is a diagram for describing an architecture according to a third variation.

FIG. 30 is an explanatory diagram for describing a use case of an architecture according to this embodiment.

FIG. 31 is an explanatory diagram for describing a use case of an architecture according to this embodiment.

FIG. 32 is an explanatory diagram or describing a use case of an architecture according to this embodiment.

FIG. 33 is an explanatory diagram for describing a use case of an architecture according to this embodiment.

FIG. 34 is an explanatory diagram for describing a use case of an architecture according to this embodiment.

FIG. 35 is a block diagram illustrating an example of a schematic configuration of a server.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference signs, and repeated explanation of these structural elements is omitted.

Note that, in this specification and the appended drawings, elements that have substantially the same function and structure are sometimes distinguished from each other using different alphabets after the same reference sign. For example, if necessary, elements that have substantially the same function and structure (e.g., communication control apparatuses 10A and 10B) are distinguished from each other. However, when it is not particularly necessary to distinguish elements that have substantially the same function and structure, the same reference sign alone is attached. For example, when it is not particularly necessary to distinguish the communication control apparatuses 10A and 10B from each other, each apparatus is simply called a communication control apparatus 10.

Note that description will be provided in the following order.
1. Overview
1.1. General configuration of system
1.2. Description of licenses
1.3. Description of functional entities
1.4. Technical problems
2. First embodiment
2.1. Architecture
2.2. Examples of configuration of CoE
2.3. Technical features of CoE
2.4. Procedures
3. Variations
4. Use cases
5. Applications
6. Conclusion

1. OVERVIEW

1.1. General Configuration of System

FIG. 1 is an explanatory diagram of an overview of a communication system according to an embodiment of the present disclosure.

Referring to FIG. 1, shown are a plurality of secondary usage nodes 30A included in a secondary system A and a plurality of secondary usage nodes 30B included in a secondary system B. As shown in FIG. 1, the secondary usage nodes 30 are a transmitter station, such as, typically, a base station, access point, or the like. The secondary usage nodes 30A, which are a transmitter station, provide a service of the secondary system A to a receiver station that is located in a service area 40A. Similarly, the secondary usage nodes 30B, which are a transmitter station, provide a service of the secondary system B to a receiver station that is located in a service area 40B. In the description that follows, a transmitter station and a receiver station included in a secondary system may be collectively referred to as secondary usage nodes.

The secondary wage nodes 30A and 30B are connected to communication control apparatuses 10A and 10B, respectively. The communication control apparatuses 10 are an apparatus that is introduced in order to control the coexistence of a plurality of secondary systems that use frequency channels allocated to a primary system. The communication control apparatuses 10A and 10B are connected to a geo-location database (GLDB) 20. The GLDB 20 has a function of notifying each secondary system of a list and/or transmission power of available frequencies, and typically protects the primary system (incumbent protection). For example, the communication control apparatus 10 acquires, from the GLDB 20, a frequency band that is allocated to the primary system and is available for secondary usage, and causes a secondary system that is managed and/or controlled (hereinafter also simply referred to "under management") by the communication control apparatus 10 to use the frequency band.

Note that examples of a primary system include TV broadcasting systems, program making and special events (PMSE), radars (military radars, ship-borne radars, weather radars, etc.), fixed satellite services (FSS), earth exploration satellite services (EESS), and the like.

Here, the service areas 40 (i.e., 40A and 40B) of a plurality of secondary systems may geographically overlap, and in addition, frequency bands used therein may overlap. Specifically, for example, an area Where a Long Term Evolution (LTE) service is provided by an operator and an area where a Wi-Fi service is provided by another operator may overlap.

In this embodiment, it is assumed that, in such a situation, all or a portion of a frequency band allocated to a primary system is secondarily used by one or more secondary systems in cooperation with each other. To achieve this, it is desirable that information could be smoothly exchanged between a plurality of secondary systems.

1.2. Description of Licenses

In general, a license to use frequencies is granted by a frequency management authority or the like in each country. An example form of licensing is shown in Table 1.

generally called "licensed," in which the grant of a license is required. For example, a license is granted to a primary system according to this regime. For example, this regime is applied to mobile communication operators, broadcasting operators, and the like. Meanwhile, the "license-exempt" is a regime generally called "unlicensed," in which the grant of a license is not required. For example, typical wireless local area network (WLAN) devices, Bluetooth (registered trademark) devices, and the like are used in this regime. The "light-licensing" is a regime in which a non-exclusive license is typically granted.

This embodiment is concerned with wireless systems operating under the "general authorization." Note that wireless systems operating, under the "general authorization" may include, for example, devices specified in "47 C.F.R. Part 15." Examples of such devices include intentional radiators (900 MHz, 2.4 GHz and 5.8 GHz bands) specified in Subpart C, unlicensed national information infrastructure devices (5 GHz bands): specified in Subpart E, and television band devices specified in Subpart H. In addition, wireless systems operating under the "general authorization" may include, for example, devices specified in "47 C.F.R. Part 96." As such devices, for example, Citizens Broadband Radio Service devices (CBSD) are being specified. The "47 C.F.R. Part 96" is an FCC rule (3.5 GHz SAS) that is being established, and can be referred to in <URL: http://apps.fcc.gov.ecfs/comment/view?=60001029680>.

Also, wireless systems operating under the "general authorization" may include, for example, devices that will be added or defined in the above rule in the future. In other words, the technology according to this embodiment is directed to all possible devices that are covered by the "general authorization" regime.

Note that the secondary usage of frequencies is provided in, for example, the "light-licensing" regime." The coexistence of a plurality of secondary systems that are a wireless system operating under the "general authorization" and perform secondary usage of frequencies in the "light-licensing" regime, will be herein described. The technology according to this embodiment is, of course, also applicable to wireless systems that operate under the "general authorization" and in the "license-exempt" regime.

1.3. Description of Functional Entities

FIG. 2 is an explanatory diagram illustrating connections between the three functional entities for assistance for

TABLE 1

| Individual Authorisation (Individual rights of use) | | | General Authorisation (No individual rights of use) |
|---|---|---|---|
| Individual Licence (Traditional licensing) | | Light-Licensing | Licence-exempt |
| Individual frequency planning/coordination | Individual frequency planning/coordination | No individual frequency planning/coordination | No individual frequency planning/coordination |
| Traditional Procedure for issuing licences | Simplified procedure compared to traditional procedure for issuing licences. With limitations in the number of users | Registration and/or notification. No limitations in the number of users nor need for coordination. | No registration and/or notification. |

Table 1 is described in CEPT, "ECC Report 132: Light Licensing, Licence-Exempt and Commons," Moscow, June 2009, <URL: http://www.erodocdb.dk/docs/doc98/official/Pdf/ECCRep132.pdf>. The "individual license" is a regime coexistence. As shown in FIG. 2, in IEEE 802.19.1, functions for assistance for coexistence of secondary systems are divided into three functional entities, i.e., CMs, CEs, and CDISs.

(1) Coexistence Manager (CM)

CMs are a functional entity that makes a decision for coexistence. A CM acquires information about a primary system, information about an available channel, and information about a secondary system. The CM acquires such items of information from a CMS, another CM, a secondary usage node (accessed through a CE), or the like. The CM determines, on the basis of these items of information, what frequency channel is to be used by a secondary usage node under the management of itself to operate a secondary system. The CM may further determine, for each secondary usage node, additional control parameters, such as maximum transmission power, a recommended wireless access scheme, a location data updating cycle, and the like. Thereafter, the CM causes each secondary usage node to operate or reconfigure a secondary system according to the determined parameters.

(2) Coexistence Enabler (CE)

CEs are a functional entity that serves as an interface for mediating transmission of commands or exchange of information between a CM and a secondary usage node. For example, a CE converts information possessed by a secondary usage node into a forum that allows a CM to use the information, and transmits the converted information to the CM. The CE also converts an instruction for coexistence of secondary systems from a CM into a form that allows a secondary usage node to execute the instruction, and transmits the converted instruction to the secondary usage node.

(3) Coexistence Discovery and Information Server (CDIS)

CDISs are a functional entity that serves as a server for managing information about a plurality of secondary systems. For example, a CDIS collects information about a secondary system from each secondary usage node through a CE and a CM. The CDIS also collects, from the GLDB 20, information about a primary system and information about an available Channel. Thereafter, the CDIS accumulates the collected info nation in a database. The info nation accumulated by the CDIS is used during decision-making for coexistence performed by a CM. The CDIS may select a master CM (a CM that controls a plurality of CMs and performs decision-making in a centralized manner) from a plurality of CMs. The CDIS also has a neighbor discovery function of detecting neighboring secondary systems that may interfere with each other.

At least one of the above three functional entities is provided in each of the communication control apparatuses 10 of FIG. 1. Note that a portion of the functional entities may be provided in each secondary usage node 30. Alternatively, a portion of the functional entities may be provided in the same apparatus that includes the GLDB 20.

Note that the above three functional entities may be collectively referred to as a coexistence system. The coexistence system assists coexistence of secondary systems under the management thereof.

(4) White Space Object (WSO)

WSOs are a secondary usage node. In IEEE Std 802.19.1-2014, a WSO represents a television white space (TVWS) device or a network of TVWS devices. In this embodiment, WSOs are not limited to a TVWS device and a network of TVWS devices, and are assumed to refer to any secondary usage node or any network of secondary systems. A WSO is connected to a CM through a CE in order to receive a coexistence service that is a service for coexistence of secondary systems. Note that WSOs are a type of communication node.

(5) Registered Location Secure Server (RLSS)

RLSSs are a local server for preventing interference between terminals. A WSO is connected to the GLDB 20 through an RLSS. RLSSs are specified in IEEE Std 802.11af, which is a standard that provides a wireless access scheme for TVWSs. In IEEE Std 802.19.1-2014, RLSSs are an entity that stores information organized according to geo-locations, and accesses and manages a database which stores operation parameters and locations for one or more basic service sets.

In the foregoing, the details of each functional entity have been described. The functional entities may exchange information with each other using interfaces. As shown in FIG. 2, a CE and a WSO/RLSS can exchange information through an interface A. A CM and a CE can exchange information through an interface B1. A CM and a CDIS can exchange information through an interface B2. CMs can exchange information through an interface B3. A CM and a whitespace database can ex Change information through an interface C.

1.4. Technical Problems

In order to allow for smooth exchange of information between a plurality of secondary systems, coexistence systems that control and manage secondary systems may exchange information. A plausible example of such an architecture is shown in FIG. 3.

FIG. 3 is a diagram for describing an architecture according to a comparative example. In the comparative example shown in FIG. 3, CMs included in coexistence systems that manage different secondary systems directly have an interface therebetween. However, this architecture has the following potential disadvantages.

(1) Different Profiles

In IEEE Std 802.19.1-2014, provided are three profiles having different procedures and/or messages. Therefore, different coexistence systems may use different profiles. Also, an interface connecting CMs included in two coexistence systems shown in FIG. 3 may be similar to the interface B3. Although it may be possible to connect an interface between CMs having different profiles, the standard does not substantially permit exchange of information for coexistence. Therefore, it is difficult to achieve coexistence of a plurality of secondary systems by exchanging information between the plurality of coexistence systems, particularly by exchanging and negotiating information between CMs having different profiles.

(2) Information Security

A manager (typically, an operator) for a coexistence system is required to securely manage information that is stored by the manager themselves. CDISs have a database function, and therefore, it is assumed that a manager for a coexistence system possesses and manages their own CDIS. Note that CMs do not have a function for performing secure communication. Therefore, when CMs included in different coexistence systems managed by different managers are directly connected together by the interface B3, there is a risk of leakage of information that should be securely managed.

Therefore, with the above circumstances in mind, an architecture according to an embodiment of the present disclosure has been made. In IEEE Std 802.19.1-2014, only a case is assumed in which only one CDIS is provided, a plurality of CMs are connected to the single CDIS, and an interface is provided between each CM. However, there is the above risk to a case where a plurality of CMs are connected to different CDISs. To address this, in this embodiment, in a case where a plurality of CMs are connected to different CDISs, an appropriate interface is provided between each CM. As a result, for example, coexistence systems can accommodate a difference between profiles, and exchange information while achieving information security.

2. FIRST EMBODIMENT

2.1. Architecture

FIG. 4 is a diagram for describing an architecture according to this embodiment. As shown in FIG. 4, in the architecture according to this embodiment, a coordination enabler (CoE), which is an additional functional entity, is introduced into a coexistence system. In addition, an interface B4 for connecting a CoE and a CM, and an interface D for connecting a CoE and a CoE, are introduced. A CoE may be provided in the communication control apparatuses 10 shown in FIG. 1, the secondary usage nodes 30, the same apparatus that includes the GLDB 20, or any other apparatuses. Although not shown in FIG. 3, an interface may be provided between a GLDB and a CM in the architecture according to this embodiment as in FIG. 2.

Note that, in this embodiment, a frequency usage control system corresponds to a wireless system, such as a coexistence system or the like. A first frequency usage control system corresponds to a first coexistence system (coexistence system 1). A second frequency usage control system corresponds to a second coexistence system (coexistence system 2). A communication node corresponds to a WSO or the like, which is a communication node. A communication control determination unit corresponds to a CM. A communication control unit corresponds to a CE. A database corresponds to a CDIS. An apparatus corresponds to a CoE. A first CM, a first CE, a first CDIS, and a first CoE refer to a CM, a CE, a CDIS, and a CoE that are included in the first coexistence system. Similarly, a second CM, a second CE, a second CDIS, and a second CoE refer to a CM, a CE, a CDIS, and a CoE that are included in the second coexistence system. Note that a correspondence relationship between these terms is merely an example based on IEEE Std 802.19.1-2014. A CoE included in the first coexistence system will now be described.

2.2. Configuration Example of CoE

A configuration example of a CoE will now be described with reference to FIGS. 5 to 7.

FIG. 5 is a block diagram illustrating a configuration example of a communication control apparatus 10 according to this embodiment. The communication control apparatus 10 shown in FIG. 5 includes a CoE. Although, in FIG. 5, elements involved with the CoE are shown, the communication control apparatus 10 may include elements involved with a CM, a CE and/or a CDIS. As shown in FIG. 5, the communication control apparatus 10 includes a first communication unit 110, a second communication unit 120, and a processing unit 130.

The first communication unit 110 is a communication interface for mediating communication between the communication control apparatus 10 and a secondary usage node 30 or the like. The first communication unit 110 supports any wireless or wired communication protocol, and establishes communication connection between one or more secondary usage nodes 30.

The second communication unit 120 is a communication interface for mediating communication with another communication control apparatus 10. The second communication unit 120 supports any wireless or wired communication protocol, and establishes communication connection with another communication control apparatus 10 corresponding to a CM, a CE, or a CDIS that are included in the same coexistence system. The second communication unit 120 also establishes communication connection with another communication control apparatus 10 corresponding to a CoE included in a different coexistence system.

The processing unit 130 provides various functions of the communication control apparatus 10. The processing unit 130 includes a discovery unit 132 and an information sharing unit 134. Note that, in addition to these elements, the processing unit 130 may further include other elements. In other words, in addition to the operations of these elements, the processing unit 130 may perform other operations. The functions of the processing unit 130 will be described in detail below.

FIG. 6 is a diagram illustrating an example of a reference model of an interface of a CoE. As shown in FIG. 6, a CoE may include one of service access points (SAP) including a CoE-SAP and a Com-SAP. Note that CoE-SAPs are an SAP with respect to an interface function, and Com-SAPs are an SAP with respect to a communication function.

FIG. 7 is a diagram illustrating an example of a reference model of an interface of a CoE. As shown in FIG. 7, a CoE may have two SAPs. Alternatively, a CoE may have three or more SAPs.

2.3. Technical Features of CoE (1) Discovery Function

The discovery unit 132 has a function of acquiring information indicating the result of detection of a communication node (e.g., a secondary usage node) that is managed by a second coexistence system involved with a first coexistence system. In other words, the discovery unit 132 provides a discovery function with respect to another secondary system for which coexistence is to be achieved. As used herein, a second coexistence system involved with a first coexistence system refers to another coexistence system different from the first coexistence system, where secondary systems under the management of these coexistence systems are interfering or may interfere with each other, or the service areas of these coexistence systems overlap, or the like. This function may be implemented by, for example, a CoE discovery procedure described below.

Specifically, the discovery unit 132 notifies a second CM of a discovery signal on the basis of a request signal from a first CM. Thereafter, the discovery unit 132 notifies the first CM of information that indicates the result of detection of a neighboring node around a secondary usage node managed by the first coexistence system, the detection being performed by the second CM that has been notified of the discovery signal. This function may be implemented by, for example, a neighbor discovery request procedure and a CoE discovery procedure described below. Here, the request signal from the first CM is transmitted on the basis of the result of measurement performed by a secondary usage node managed by the first coexistence system or the result of calculation performed by the first CM for controlling the secondary usage node. Therefore, a CM can use the discovery function for coexistence when necessary.

(2) Information Sharing Function

The information sharing unit 134 has a function of notifying a second CM included in a second coexistence system of first sharable information that is generated from first frequency usage information related to a communication node managed by the first coexistence system and that is held by a first CDIS or a first CM that are included in a first coexistence system. This function may be implemented by, for example, a share data request procedure, an inter-CoE data indication procedure, and a spectrum usage information indication procedure described below. Note that the first frequency usage information that is related to secondary usage of frequencies by a secondary usage node managed by a first coexistence system, is also referred to as first frequency secondary usage information. The information sharing unit 134 may generate the first sharable information from the first frequency secondary usage information.

Alternatively, the information sharing unit 134 may notify a first CM of second sharable information that is generated from second frequency usage information related to a communication node indicated by information acquired by the discovery unit 132 and that is held by a second CDIS or second CM included in a second coexistence system. This function may be implemented by, for example, a spectrum usage information request procedure, an inter-CoE data exchange request procedure, and a share data request procedure described below. Note that the second frequency usage information that is related to secondary usage of frequencies by a secondary usage node managed by a second coexistence system, is also referred to as second frequency secondary usage information. The second sharable information may be generated from the second frequency secondary usage information.

Note that the first shamble information is information that is shared from a first coexistence system to a second coexistence system. The second sharable information is information that is shared from a second coexistence system to a first coexistence system. When the first shamble information is not particularly distinguished from the second sharable information, these items of information are hereinafter collectively referred to as the sharable information. The first frequency secondary usage information is information of a secondary usage node under the management of a first coexistence system, and the second frequency secondary usage information is information of a secondary usage node under the management of a second coexistence system. When the first frequency secondary usage information is not particularly distinguished from the second frequency secondary usage information, these items of information are hereinafter collectively refereed to as the frequency secondary usage information. The same applies to the frequency usage information.

The frequency secondary usage information typically refers to information managed by a CDIS or a CM. The frequency secondary usage information that indicates at least a geo-location, available frequencies (operating frequencies, a bandwidth, an available frequency list), transmission power (a max EIRP, an antenna gain), and wireless access scheme of a secondary system (or a secondary usage node), is desirably sharable. Moreover, the frequency secondary usage information that indicates the total number and coverage of secondary systems (or secondary usage nodes) is also desirably shamble. Note that the frequency usage information is typically managed by a CDIS or a CM, and includes, in addition to the frequency secondary usage information, information such as a geo-location, available frequencies, or the like of a communication node other than secondary usage nodes.

The information sharing unit 134, when reporting the sharable information, may report information indicating a difference between that sharable information and the previously reported information. As a result, the amount of communication is reduced. Note that such a difference is extracted by a CM which is a source of the frequency secondary usage information. In other words, a CoE may not include a storage unit.

Note that the information sharing unit 134 may generate the first sharable information on the basis of the first frequency secondary usage information. The first sharable information is generated by selecting the first sharable information from the first frequency secondary usage information or converting the first frequency secondary usage information into the first sharable information. Alternatively, the first sharable information may be generated by, for example, a first CM. The shamble information may be generated by, for example, a share data request procedure described below.

The sharable information may be information that corresponds to a profile used in a coexistence system Which is notified of the information. For example, when a coexistence system to which a CoE itself belongs and a coexistence system to which the sharable information is reported use different profiles, the information sharing unit 134 selects, as the sharable information, information that is common to the different profiles. Alternatively, the information sharing unit 134 may generate the sharable information by converting information that is used in a profile of a coexistence system to which a CoE itself belongs into a form that can be used in a profile used in a coexistence system to which the sharable information is reported. Thus, information that accommodates a difference between profiles is shared, and therefore, information for coexistence can be exchanged between coexistence systems that use different profiles.

Alternatively, the sharable information may be information that is permitted to be published to a coexistence system which is notified of the information. For example, the information sharing unit 134 may select, as the shamble information, information that is permitted to be published to other coexistence systems. Alternatively, the information sharing unit 134 may convert (e.g., conceal, change, etc.) all or a portion of information so that the information is permitted to be published to other coexistence systems. Thus, only information for which information security is established is shared, and therefore, information for coexistence can be securely exchanged between coexistence systems managed by different managers.

Alternatively, the sharable information may be information from which the privacy of an individual such as, for example, the owner of a wireless system or the like is not capable of being identified. For example, as to location information, the location information of an access point that is privately used by an individual is not the sharable information, because the privacy of the individual may be identified from such location information. Meanwhile, the location information of an access point for business use (e.g., an access point, base station, etc., of carrier Wi-Fi) is the sharable information, because the privacy of an individual is not identified from such location information. Thus, whether information is sharable is determined on the basis of whether the privacy of an individual can be identified, and therefore, information can be shared while privacy is protected.

The information sharing unit 134, when a license or priority given to at least a portion of a frequency band used by a secondary usage node managed by a first coexistence system has changed, may notify a CM in another coexistence system that uses the band, of information about the license or priority. For example, a CoE, when a secondary system managed by a coexistence system or a manager thereof has been granted a license for a portion of a sharing frequency band from a national regulatory authority, notifies a CoE in another coexistence system that uses the band, of that situation. For example, when a license for the exclusive use of a portion of a sharing frequency band in a certain geographical region has been granted by an NRA, this notification requests another coexistence system to stop using the same geographical region and the same band, and use a different geographical region or a different band. Such a notification allows for coexistence that depends on a granted license. The same applies to priority. This function may be implemented by, for example, an inter-CoE Priority-based Information indication procedure and an inter-CoE priority-based Information request procedure described below.

(3) Communication Function

As shown in FIG. 4, a CoE may be included in each coexistence system. In this case, the discovery unit 132 and the information sharing unit 134 communicate with a CM included in another coexistence system through another CoE included in that coexistence system. As a result, a CoE can function as an interface with respect to the outside of a coexistence system.

Alternatively, as shown in FIG. 25 described below, a CoE may not be included in any coexistence system and may be provided independently of coexistence systems. In this case, the discovery unit 132 and the information sharing unit 134 communicate with a CM included in each coexistence system without through another CoE. As a result, a CoE can function as an external interface that connects coexistence systems.

Alternatively, as shown in FIG. 26 described below, an external entity may be provided outside a coexistence system. In this case, the information sharing unit 134 may notify the external entity of the sharable information. More specifically, the information sharing unit 134 may notify the external entity of the sharable information regularly or irregularly on the basis of a request from the external entity.

2.4 Procedures

Next, an example of procedures that are introduced along with the introduction of a CoE will be described. Note that the names of procedures and communicated messages used below are merely for illustrative purposes, and any other names may be used.

(1) Neighbor Discovery Request Procedure

This procedure is for allowing a CM to request a CoE to discover another CoE through the interface D. This procedure is used in the same coexistence system.

FIG. 8 is an explanatory diagram for describing the neighbor discovery request procedure. As shown in FIG. 8, a CM transmits a neighbor discovery request to a CoE (step S10). Next, the CoE transmits a neighbor discovery response to the CM (step S12).

The neighbor discovery request may contain the identification information (ID), IP address, port number, manager ID (operator ID), target area information indicating an area where discovery is performed, and the like of a CM.

The neighbor discovery response may contain the ID, IP address, port number, information sharability flag (true/Use), manager ID (operator ID), and the like of a CoE. The information sharability flag, is information indicating whether information about a communication node under the management of a coexistence system is sharable with another coexistence system. It is determined whether such information is to be shared (e.g., whether to request another CoE to share such information), on the basis of the information sharability flag. A CoE may transmit, to a CM, the information sharability flag obtained from another CoE using a CoE discovery procedure described below, with the information sharability flag being contained in the neighbor discovery response. Alternatively, a CoE may determine the information sharability flag by itself and transmit the information sharability flag to a CM.

This procedure may be used in various situations. For example, a CM may use this procedure when determining that there is strong interference from a neighboring communication node, on the basis of the result of measurement of a communication node under the management of the CM. In addition, a CM may use this procedure when determining that it is necessary to acquire information about a neighboring WSO that has been determined to have strong interference, from a different coexistence system that manages the WSO, during calculation involved in the control of WSOs.

(2) CoE Discovery Procedure

This procedure is for allowing a CoE to discover another CoE. This procedure is used by different coexistence systems, such as, for example, a first CoE and a second CoE, or the like.

FIG. 9 is an explanatory diagram for describing the CoE discovery procedure. The last numeral of each functional entity in FIG. 9 indicates the index of a coexistence system. For example a "CoE 1" is a first CoE included in a first coexistence system, and a "CoE 2" is a second CoE included in a second coexistence system. The same applies to the following diagrams. As shown in FIG. 9, the first CoE transmits a CoE discovery to the second CoE (step S20). Next, the second CoE transmits a CoE discovery response to the first CoE (step S28).

The CoE discovery is a discovery signal. The CoE discovery may contain the ID, IP address, port number, manager ID (operator ID), target area information indicating an area where discovery is performed, and the like of a CoE. A CoE, when having specified another CoE as a target, may transmit the CoE discovery to that CoE as a target. A CoE, when not having specified another CoE as a target, may broadcast the CoE discovery.

The CoE discovery response is a response to the discovery signal. The CoE discovery response may contain the ID, IP address, port number, information sharability flag, manager ID (operator ID), and the like of a CoE.

The second CoE may determine the information sharability flag by itself. Alternatively, the second CoE may acquire the information sharability flag from a CM as shown in FIG. 10.

FIG. 10 is an explanatory diagram for describing the CoE discovery procedure. FIG. 10 shows a flow until the second CoE that has received the CoE discovery in FIG. 9 returns the CoE discovery response. As shown in FIG. 10, the second CoE that has received the CoE discovery transmits a discovery request to a CM included in the same coexistence system (second coexistence system) (step S22). Thereafter, in the CM, a decision for neighbor discovery is made (decision making for neighbor discovery) to determine the information sharability flag (step S24). Next, the CM returns a discovery response containing the determined information sharability flag to the second CoE (step S26).

Note that when the CoE discovery contains target area information, the information sharability flag may be determined on the basis of whether a WSO under management is included in the target area. For example, the information sharability flag is determined not to be sharable (false) when the WSO under management is not included in the target area, and to be sharable (true) when the WSO under management is included in the target area. Also, the information sharability flag may be determined not to be sharable when a WSO having high priority is included under management. This is because frequencies allocated to a WSO having a high priority are typically not secondarily used.

(3) Share Data Request Procedure

This procedure is for acquiring information shared by CoEs (hereinafter also referred to as sharing information). This procedure is used in the same coexistence system.

FIG. 11 is an explanatory diagram for describing a share data request procedure. As shown in FIG. 11, initially, a CoE transmits a share data request to a CM (step S30). Next, the CM generates sharing information (sharing data generation) (step S32). Next, the CM transmits a share data response to the CoE (step S34). Thereafter, the CoE translates the information if necessary (information translation if necessary) (step S36).

For example, as the information translation if necessary, a CoE generates sharing information that accommodates a difference between profiles and for which information security is established. Such sharable information generation may be performed in the information generation process by a CM or in the translation process by a CoE.

A CM, when generating sharing information, may acquire information from a CMS or another CM. For example, when there are a master CM and a slave CM, the slave CM is not connected to a CoE, and a CoE requires the frequency secondary usage information related to a secondary usage node managed by the slave CM, the master CM acquires the frequency secondary usage information from the slave CM. Such a procedure may also be referred to as, for example, a proxy information sharing procedure.

(4) Inter-CoE Data Exchange Request Procedure

This procedure is for allowing a CoE to receive the frequency secondary usage information from another CoE. This procedure is used by different coexistence systems, such as, for example, a first CoE and a second CoE, or the like.

FIG. 12 is an explanatory diagram for describing the inter-CoE data exchange request procedure. As shown in FIG. 12, a first CoE transmits a Cx info request to a second CoE (step S40). Next, the second CoE transmits a Cx info response to the first CoE (step S42).

The Cx info request contains the ID, profile information indicating a profile used in a coexistence system (first coexistence system), and target area information of a CoE.

The Cx info response contains the frequency secondary usage information. Here, the frequency secondary usage information contained in the Cx info response is the shamble information that is generated or translated by a CM on the second CoE's side or the second CoE in "(3) Share data request procedure." The sharable information may be generated or translated by, for example, selecting only information about a WSO that is a neighbor around a WSO on the first CoE's side, or removing information that should not be shared for the purpose of information security. Also, when a first coexistence system and a second coexistence system use different profiles, only information may be used in common regardless of profiles, or recalculation or the like may be performed in order to accommodate a difference between profiles.

(5) Inter-CoE Data Indication Procedure

This procedure is for allowing a CoE to provide the frequency secondary usage information to another CoE. This procedure is used by different coexistence systems, such as, for example, a first CoE and a second CoE, or the like.

FIG. 13 is an exploratory diagram for describing the inter-CoE data indication procedure. As shown in FIG. 13, initially, a first CoE transmits a Cx info indication to a second CoE (step S50). Next, the second CoE transmits a Cx info confirm to the first CoE (step S52).

The Cx info indication may contain the ID, frequency secondary usage information, profile information, and the like of a CoE. Here, the frequency secondary usage information contained in the Cx info indication may be generated or translated by a CM on the first CoE's side or the first CoE. Here, the generation or translation is similar to that which has been described in "(4) Inter-CoE data exchange request procedure."

(6) Spectrum Usage Information Request Procedure

This procedure is for allowing a CM to notify a CoE of a request for the frequency secondary usage information.

FIG. 14 is an explanatory diagram for describing the spectrum usage information request procedure. As shown in FIG. 14, initially, a CM transmits a spectrum usage info request to a CoE (step S60). Next, the CoE transmits a spectrum usage into response to the CM (step S62).

The spectrum usage info request may be a message for only requesting any sharable information. Also, the spectrum usage info request may contain information that specifies requested information.

The spectrum usage info response contains the frequency secondary usage information acquired from another CoE. When there is an update on the previously reported information, only the difference may be contained.

(7) Spectrum Usage Information Indication Procedure

This procedure is for allowing a CoE to notify a CM of the frequency secondary usage information acquired from another CoE.

FIG. 15 is an explanatory diagram for describing the spectrum usage information indication procedure. As shown in FIG. 15, initially, a CoE transmits a spectrum usage info indication to a CM (step S70). Next, the CM transmits a spectrum usage info confirm to a CoE (step S72).

The spectrum usage info indication contains the frequency secondary usage information acquired from another CoE. When there is an update on the previously reported information, only the difference may be contained.

(8) General Flow

FIG. 16 is a sequence diagram for describing an example of a general flow of a procedure according to this embodiment. As shown in FIG. 16, a first CM, a first CoE, a second CoE, and a second CM are involved with this sequence. As shown in FIG. 16, initially, a discovery process is performed (step S80). Next, an information exchange process (step S82) is performed. A detailed flow of the discovery process will now be described with reference to FIG. 17.

FIG. 17 is a sequence diagram for describing a flow of the discovery process according to this embodiment. As shown in FIG. 17, a first CM, a first CoE, a second CoE, and a second CM are involved with this sequence. Initially, the first CM transmits the neighbor discovery request to the first CoE (step S90), and the first CoE transmits the CoE discovery to the second CoE (step S91). Next, the second CoE transmits the discovery request to the second CM (step S92), and the second CM makes a decision for neighbor discovery (decision making for neighbor discovery) (step S93), and transmits the discovery response to the second CoE (step S94). Thereafter, the second CoE transmits the CoE discovery response to the first CoE (step S95), and the first CoE transmits the neighbor discovery response to the first CM (step S96).

Next, a detailed flow of the information exchange process will be described with reference to FIGS. 18 and 19. Note that FIG. 18 shows a request base process, and FIG. 19 shows an indication base process. These processes may be used in combination or only one of these processes may be used.

FIG. 18 is a sequence diagram for describing an example of a flow of the information exchange process according to this embodiment. As shown in FIG. 18, a first CM, a first CoE, a second CoE, and a second CM are involved with this sequence. Initially, the first CM transmits the spectrum usage info request to the first CoE (step S100), and the first CoE transmits the Cx info request to the second CoE (step S101). Next, the second CoE transmits the share data request to the second CM (step S102), and the second CM generates sharing information (sharing data generation) (step S103). Next, the second CM transmits the share data, response to the second CoE (step S104), and the second CoE translates information if necessary (information translation if necessary) (step S105). Next, the second CoE transmits the Cx info response to the first CoE (step S106), and the first CoE transmits the spectrum usage info response to the first CM (step S107).

FIG. 19 is a sequence diagram for describing an example of a flow of the information exchange process according to this embodiment. As shown in FIG. 19, a first CM, a first CoE, a second CoE, and a second CM are involved in this sequence. Initially, the first CoE transmits the share data request to the first CM (step S110), and the first CM generates sharing information (sharing data generation) (step S111). Next, the first CM transmits the share data response to the first CoE (step S112), and the first CoE translates information if necessary (information translation if necessary) (step S113). Next, the first CoE transmits the Cx info indication to the second CoE (step S114), and the second CoE transmits the spectrum usage info indication to the second CM (step S115). Next, the second CM transmits the spectrum usage info confirm to the second CoE (step S116), and the second CoE transmits the Cx info confirm to the first CoE (step S117).

Note that the various procedures described above may be combined as appropriate. For example, the share data response of step S104 of FIG. 18 may be transmitted along with the discovery response of step S94 of FIG. 17. Also, the share data request of step S110 of FIG. 19 may be transmitted along with the neighbor discovery response of step S96 of FIG. 17.

In the foregoing, an example of a general flow of the procedure according to this embodiment has been described. Next, a procedure that is introduced in order to achieve coexistence for each sub-channel of a sharing frequency band will be described. The following procedure may be used when different licenses, or different priorities of a secondary usage node, are provided for different sub-channels of a sharing frequency band.

FIGS. 20 to 22 are diagrams for describing coexistence for each sub-channel of a Sharing frequency band. As shown in FIG. 20, it is assumed that a sharing frequency band 200 is divided into any N sub-channels. Each sub-channel is a smallest allocation channel unit.

FIG. 21 shows an example in which different licenses are allowed to be set for different sub-channels. In FIG. 21, a priority access license (PAL) refers to a license that permits exclusive use of frequencies. A general authorized access (GAA) refers to a license that essentially requires protection of a secondary usage node that operates under a license that permits exclusive use of frequencies. Note that, in the GAA, interference may occur between GAA users. In such a case where different licenses are set, if information about a license granted to a secondary usage node is shared between coexistence systems (e.g., operators), a higher level of coexistence can be achieved. For example, a coexistence system can protect a secondary usage node that operates under a license that permit exclusive use of frequencies, and at the same time, can achieve coexistence of secondary usage nodes (e.g., within an operator, between operators, etc.) that operate under another license, taking into consideration interference from the secondary usage node (e.g., intra-operator interference, inter-operator interference, etc.).

FIG. 22 shows an example in which setting of different priorities for different sub-channels is permitted. For example, a sub-channel #0 can be used only by a secondary usage node having a high priority, a sub-channel #1 can be used by a secondary usage node having a high priority and a secondary usage node having a low priority, and a sub-channel #4 can be used only by a secondary usage node having a low priority. When different priorities are thus provided, then if the frequency secondary usage information containing priority information of a secondary usage node is shared by coexistence systems (e.g., operators), a higher level of coexistence can be achieved. Note that a priority is set by, for example, QoS guarantee or the like. A common index may be used by coexistence systems (e.g., operators).

(9) Inter-CoE Priority-Based Information Request Procedure

This procedure is for requesting the frequency secondary usage information that contains information about a license or priority in a sharing frequency band. When there is a change in a license of priority in a sharing frequency band, each coexistence system Can Use this procedure to perform calculation for controlling the frequency secondary usage of a secondary usage node under the management thereof. This procedure is used by different coexistence systems, such as, for example, a first CoE and a second CoE, or the like.

FIG. 23 is an explanatory diagram for describing the inter-CoE priority-based information request procedure. As shown in FIG. 23, a first CoE transmits a priority info request to a second CoE (step S120). Next, the second CoE transmits a priority info response to the first CoE (step S122).

The priority info response may contain a geo-location (information indicating a location or region where a license is valid, a location of a high priority node, etc.), information about a band (information indicating the center frequency, upper limit frequency, lower limit frequency, bandwidth, valid period, license type, priority type, etc.), and the like.

(10) Inter-CoE Priority-Based Information Indication Procedure

This procedure is for providing the frequency secondary usage information that contains information about a license or priority in a sharing frequency band.

FIG. 24 is an explanatory diagram for describing the inter-CoE priority-based information indication procedure. As shown in FIG. 24, a first CoE transmits a priority info indication to a second CoE (step S130). Next, the second CoE transmits a priority info confirm to the first CoE (step S132).

The priority info indication may contain a geo-location (information indicating a location or region where a license is valid, a location of a high priority node, etc.), information about a band (information indicating the center frequency, upper limit frequency, lower limit frequency, bandwidth, valid period, license type, priority type, etc.), and the like.

3. VARIATIONS

Variations of the architecture according to the first embodiment will now be described.
(1) First Variation
FIG. 25 is a diagram for describing an architecture according to a first variation. As shown in FIG. 25, in addition to coexistence systems, a CoE is introduced into the architecture according to this variation. In this variation, the CoE and each coexistence system are connected together by an interface B4.

In the architecture according to this variation, the interface D is removed from the architecture shown in FIG. 4. Therefore, in the architecture according to this variation, procedures used by different coexistence systems (procedures with a name containing "inter-CoE") can be removed.
(2) Second Variation
FIG. 26 is a diagram for describing an architecture according to a second variation. As shown in FIG. 26, in the architecture according to this variation, an external entity and an interface E for connecting the external entity and CoEs are introduced into the architecture shown in FIG. 4. The external entity may be, for example, a monitoring entity for monitoring the state of use of frequencies, or sensing entities for performing various types of sensing.

The interface E is provided between the external entity and CoEs. For example, when the external entity is a monitoring entity, a regulatory can observe the state of use of frequencies, and allows a system managed by the regulatory to use frequencies that the regulatory has determined are available. Alternatively, for example, when the external entity is a sensing entity, a higher level of coexistence control can be achieved using the result of sensing.

In this variation, as shown in FIGS. 27 and 28, the external entity can acquire the state of use of frequencies by using the Cx info request and the Cx info response, or the Cx info indication and the Cx info confirm.

FIG. 27 is an explanatory diagram for describing a procedure for the external entity according to this variation. As shown in FIG. 27, initially, the external entity transmits the Cx info request to a CoE (step S140). Next, the CoE transmits the Cx info response to the external entity (step S142).

FIG. 28 is an explanatory diagram for describing a procedure for the external entity according to this variation. As shown in FIG. 28, initially, a CoE transmits the Cx info indication to the external entity (step S150). Next, the external entity transmits the Cx info confirm to the CoE (step S152).
(3) Third Variation
FIG. 29 is a diagram for describing an architecture according to a third variation. As shown in FIG. 29, in the architecture according to this variation, in addition to coexistence systems, an external entity and a CoE are introduced. In this architecture, a CoE included in each coexistence system and a CoE included in the external entity are connected together by an interface D.

4. USE CASES

A use case where each of the architectures described above is implemented will now be described.
(1) First Use Case
FIG. 30 is an explanatory diagram for describing a use case of an architecture according to this embodiment. This use case is an example in which the architecture shown in FIG. 4 is implemented. The last numeral of each functional entity in FIG. 30 is the index of a coexistence system, and the index of the same functional entity in the same coexistence system. For example, a "CDIS 1" is a CMS included in a first coexistence system and a "CM 1-1" is a first CM included in the first coexistence system. A solid line indicates an intra-line, a double line indicates the Internet line, and functional entities having the same color indicate that these functional entities are managed by the same manager. The same applies to the following diagrams. Such implementation is provided for, for example, coexistence of wireless LAN (e.g., operator-managed Wi-Fi) systems provided by different mobile network operators (MNO).

In recent years, an increasing number of wireless LAN systems have been installed by MNOs in order to offload increasing traffic. However, wireless LAN systems employ earlier sense multiple access-collision avoidance (CSMA/CA) as a multiple access scheme, unlike cellular, and do not perform a centric interference control or the like. Therefore, the usability of a wireless LAN may decrease in an area where communication is congested, such as city centers, stations, apartment buildings, commercial facilities, event sites, and the like. It is also envisaged that MNOs will introduce, into the 5 GHz band (license-exempt band), not only wireless LANs, but also Licensed-Assisted Access using LTE (LTE-LAA), which is being studied in the 3GPP. Moreover, an LIE scheme that operates only in license-exempt bands may be developed in the future.

Therefore, it is desirable that an appropriate coexistence scheme for preventing the decrease in usability be provided not only in a network managed by the same MNO but also between networks managed by different MNOs, and not only in the same radio access technology (RAT) but also between different RATs.

However, when the architecture of IEEE 802.19.1 is directly diverted to another band, then even if each MNO can manage a CDIS to control the use of frequencies in the MNO's network, coexistence is not achieved between networks managed by different MNOs.

In this regard, according to the technique provided in this embodiment, coexistence can be easily achieved even between networks managed by different MNOs, and not only in the same radio access technology (RAT) but also between different RATs. This is because, in the architecture according to this embodiment, a CoE is introduced that functions as an interface between networks managed by different MNOs, so that the frequency secondary usage information can be appropriately exchanged between networks managed by different MNOs.
(2) Second Use Case
FIG. 31 is an explanatory diagram for describing a use case of an architecture according to this embodiment. This use case is an example in which the architecture shown in FIG. 25 is implemented. A CoE may be Shared by MNOs (a form of infra-sharing). A separate operator of a CoE may exist.

(3) Third Use Case

FIG. 32 is an explanatory diagram for describing a use case of an architecture according to this embodiment. This use case is an example in Which the architecture shown in FIG. 4 is implemented in an electronic toll collection (ETC) system for vehicles. In FIG. 32, a double dashed line indicates a wireless communication channel. As shown in FIG. 32, an ETC system is managed under the control of a first CDIS (e.g., a communication node 1-3). Also, an MNO's network is provided in the vicinity of a highway under the control of a second CDIS (e.g., a communication node 2-2). In such a use case, coexistence can be easily achieved by the architecture according to this embodiment.

(4) Fourth Use Case

FIG. 33 is an explanatory diagram for describing a use case of an architecture according to this embodiment. In the use case shown in FIG. 33, small cell eNBs and Wi-Fi access points (AP) each have a CE, and core networks and enterprise servers each have a CM, a CDIS, and a CoE.

LTE-LAA, introduction of carrier aggregation using a licensed-spectrum and a license-exempt spectrum are being studied. In this regard, if Wi-Fi using the same band is managed and controlled by an operator, and another Wi-Fi network beyond the management is detected by a CoE, aggregation of different RATs can be achieved, and in addition, communication quality may be further improved.

(5) Fifth Use Case

FIG. 34 is an explanatory diagram for describing a use case of an architecture according to this embodiment. In the use case shown in FIG. 34, a network managed by a shopping mall and networks managed by enterprises that are a tenant of the shopping mall simultaneously exist on the same floor of the shopping mall. Thus, in an office building or the like, it is often that one or more enterprises occupy the office building, and construct their own networks using Wi-Fi. In such a case, each enterprise has its own server to manage a network in a centralized manner. In such a case, as shown in FIG. 34, if each server has a CoE in addition to a CM and a CDIS, not only coexistence within the own network, but also coexistence with an external LTE-LAA network or the like, can be easily achieved.

5. APPLICATION EXAMPLES

The technology of an embodiment of the present disclosure is applicable to various products. For example, the communication control apparatus 10 may be realized as any type of server such as a tower server, a rack server, and a blade server. At least a part of elements of the communication control apparatus 10 may be realized in a control module (such as an integrated circuit module including a single die, and a card or a blade that is inserted into a slot of a blade server) mounted on a server.

FIG. 35 is a block diagram illustrating an example of a schematic configuration of a server 700 to which the technology of an embodiment of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 illustrated in FIG. 35, the interval control unit 142, the allocation control unit 144, and the processing unit 130 described by using FIG. 5 may be implemented by the processor 701. As an example, a program for causing a processor to function as the interval control unit 142, the allocation control unit 144, and the processing unit 130 (in other words, a program for causing a processor to execute the operations of the interval control unit 142, the allocation control unit 144, and the processing unit 130) may be installed in the server 700 and the processor 701 may execute the program. As another example, a module including the processor 701 and the memory 702 may be mounted on the server 700 and the interval control unit 142, the allocation control unit 144, and the processing unit 130 may be implemented by the module. In this case, the above module may store a program for causing a processor to function as the interval control unit 142, the allocation control unit 144, and the processing unit 130 in the memory 702 and execute the program by the processor 701. As described above, the server 700 or the above module may be provided as an apparatus including the interval control unit 142, the allocation control unit 144, and the processing unit 130, or the above program for causing a processor to function as the interval control unit 142, the allocation control unit 144, and the processing unit 130 may be provided. Alternatively, a readable recording medium having the above program recorded thereon may be provided.

6. CONCLUSION

In the foregoing, an embodiment of the present disclosure has been described in detail with reference to FIGS. 1 to 35. As described above, a CoE according to this embodiment can acquire information indicating the result of detection of a communication node managed by a second frequency usage control system associated with a first frequency usage control system. As a result, for secondary usage of frequencies, a CM of a coexistence system can use the discovery function with respect to another coexistence system when: secondary systems under the management thereof interfere, or may interfere, with each other; service areas thereof overlap; or the like. Also, a CoE according to this embodiment notifies a second communication control determination unit included in a second frequency usage control system, of the sharable information generated from the frequency usage information related to a communication node managed by a first frequency usage control system. As a result, information for coexistence is shared by coexistence systems. Thus, information can be smoothly exchanged between a plurality of secondary systems.

Here, the sharable information may be information that corresponds to a profile which is used in a coexistence system which is notified of the information. As a result, information that accommodates a difference between profiles is shared, and therefore, information for coexistence can be exchanged even between coexistence system employing different profiles.

Alternatively, the sharable information may be information that is permitted to be published to a coexistence system which is notified of the information. As a result, only information for Which information security is established is shared, and therefore, information for coexistence can be securely exchanged between coexistence systems managed by different managers.

Alternatively, the sharable information May be information for which the privacy of an individual such as, for example, the owner of a wireless system or the like is not capable of being identified. As a result, information can be shared while privacy is protected.

It should be understood by those skilled in the art that various modifications, combinations, sub-combinations and alterations may occur depending on design requirements and other factors insofar as they are within the scope of the appended claims or the equivalents thereof.

In addition, a computer program for causing a processor (e.g., a CPU, DSP, etc.) included in an apparatus described herein (e.g., a base station, a base station apparatus or a module for a base station apparatus, or a terminal apparatus or a module for a terminal apparatus) to function as elements (e.g., the processing unit 130, etc.) of the apparatus (in other words, a computer program for causing the above processor to execute operations of elements in the above apparatus) can be created. Also, a recording medium storing the computer program may be provided. Also, an apparatus including a memory that stores the computer program, and one or more processors that can execute the computer program (e.g., a base station, a base station apparatus or a module for a base station apparatus, or a terminal apparatus or a module for a terminal apparatus) may be provided. Also, a method including operations of elements (e.g., the processing unit 130, etc.) of the above apparatus is included in the technology according to an embodiment of the present disclosure.

Note that it is not necessary for the processing described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to an embodiment of the present disclosure can exhibit other effects that are evident to those skilled in the art along with or instead of the effects based on the present specification.

Additionally, the present technology may also be configured as below.

(1)

An apparatus including:

a discovery unit configured to acquire information indicating a result of detection of a communication node managed by a second frequency usage control system associated with a first frequency usage control system; and an information sharing unit configured to notify a second communication control determination unit included in the second frequency usage control system, of first sharable information generated from first frequency usage information related to a communication node managed by the first frequency usage control system, the first sharable information being held by a first database or a first communication control determination unit each included in the first frequency usage control system.

(2)

The apparatus according to (1), wherein the information sharing unit notifies the first communication control determination unit of second sharable information generated from second frequency usage information related to a communication node indicated by information acquired by the discovery unit, the second frequency usage information being held by a second database included in the second frequency usage control system, or the second communication control determination unit.

(3)

The apparatus according to (1) or (2), wherein the apparatus is included in each frequency usage control system, and Wherein the discovery unit and the information sharing unit communicate with a communication control determination unit included in another frequency usage control system through the other apparatus included in the other frequency usage control system.

(4)

The apparatus according to (1) or (2), wherein the apparatus is not included in any frequency usage control system, and wherein the discovery unit and the information sharing unit communicate with a communication control determination unit included in each frequency usage control system without passing through another apparatus.

(5)

The apparatus according to any one of (1) to (4), wherein the sharable information corresponds to a profile used in a frequency usage control system that is notified of the sharable information.

(6)

The apparatus according to any one of (1) to (5), wherein the sharable information is permitted to be published to a frequency usage control system that is notified of the sharable information.

(7)

The apparatus according to any one of (1) to (6), wherein the information sharing unit generates the first sharable information on the basis of the first frequency usage information.

(8)

The apparatus according to any one of (1) to (6), wherein the first shamble information is generated by the first communication control determination unit.

(9)

The apparatus according to (7) or (8), wherein the first sharable information is generated by selecting the first sharable information from the first frequency usage information or converting the first frequency usage information into the first sharable information.

(10)

The apparatus according to any one of (1) to (9), wherein the sharable information includes at least one of information indicating a geo-location of a communication node, information indicating a frequency, information indicating transmission power, or information indicating a wireless scheme.

(11)

The apparatus according to (10), wherein the sharable information includes at least one of information indicating a total number of communication nodes or information indicating coverage.

(12)

The apparatus according to any one of (1) to (11), wherein the information sharing unit reports information indicating a difference from previously reported information.

(13)

The apparatus according to any one of (1) to (12), wherein the discovery unit notifies the second communication control determination unit of a discovery signal on the basis of a request signal from the first communication control determination unit, and notifies the first communication control determination unit of information indicating a result of detection of a neighboring node around a communication node managed by the first frequency usage control system, the neighboring node being detected by the second communication control determination unit notified of the discovery signal.

(14)

The apparatus according to (13), wherein the request signal is transmitted on the basis of a result of measurement performed by a communication node managed by the first frequency usage control system or a result of calculation performed by the first communication control determination unit for controlling the communication node.

(15)

The apparatus according to any one of (1) to (14), wherein the information sharing unit, when there is a change in a license or a priority each given to at least a portion of a frequency band used by a communication node managed by the first frequency usage control system, notifies a communication control determination unit of another frequency usage control system that uses the frequency band, of information about the license or the priority (16)

The apparatus according to any one of (1) to (15), wherein the information sharing unit notifies an external entity monitoring a state of use of frequencies, of the first sharable information.

(17)

The apparatus according to (16), wherein the information sharing unit reports the first sharable information regularly or irregularly on the basis of a request from the external entity (18)

A method performed by a processor, the method including:
acquiring information indicating a result of detection of a communication node managed by a second frequency usage control system associated with a first frequency usage control system; and
notifying a second communication control determination unit included in the second frequency usage control system, of first sharable information generated from first frequency usage information related to a communication node managed by the first frequency usage control system, the first sharable information being held by a first database or a first communication control determination unit each included in the first frequency usage control system.

(19)

A program for causing a computer to function as:
a discovery unit configured to acquire information indicating a result of detection of a communication node managed by a second frequency usage control system associated with a first frequency usage control system; and
an information sharing unit configured to notify a second communication control determination unit included in the second frequency usage control system, of first sharable information generated from first frequency usage information related to a communication node managed by the first frequency usage control system, the first sharable information being held by a first database or a first communication control determination unit each included in the first frequency usage control system.

(20)

An apparatus including:
circuitry configured to
acquire information indicating a result of detection of a communication node managed by a second frequency usage control system; and
notify the second frequency usage control system of first sharable information generated from first frequency usage information related to a first communication node managed by a first frequency usage control system, wherein
the first sharable information is held by a first database included in the first frequency usage control system.

(21)

The apparatus of (20), wherein
the circuitry is configured to notify the first frequency usage control system of second sharable information generated from second frequency usage information related to a second communication node managed by the second frequency usage control system (22)

The apparatus of (21), wherein
the second frequency usage information is held by a second database included in the second frequency usage control system.

The apparatus of any of (20) to (22), wherein
the apparatus is included in the first frequency usage control system, and
the circuitry is configured to communicate with the second frequency usage control system via an interface included in the second frequency usage control system.

(24)

The apparatus of any of (20) to (22), wherein
the apparatus is not included in the first frequency usage control system or the second frequency usage control system, and
the circuitry is configured to directly communicate with the first frequency usage control system and the second frequency usage control system.

(25)

The apparatus of any of (20) to (24), wherein
the first sharable information corresponds to a profile used in a the second frequency usage control system that is notified of the sharable information.

(26)

The apparatus of any of (20) to (25), wherein
the first sharable information is permitted to be published to the second frequency usage control system that is notified of the first sharable information.

(27)

The apparatus of any of (20) to (26), wherein
the circuitry is configured to generate the first sharable information on the basis of the first frequency usage information.

(28)

The apparatus of any of (20) to (27), wherein
the first sharable information is generated by the first frequency usage control system.

(29)

The apparatus of (27), wherein
the first sharable information is generated by selecting the first sharable information from the first frequency usage information or converting the first frequency usage information into the first sharable information.

(30)

The apparatus of any of (20) to (29), wherein the first sharable information includes at least one of information indicating a geo-location of a communication node, information indicating a frequency information indicating transmission power, or information indicating a wireless scheme.

(31)

The apparatus of (11), wherein the first sharable information includes at least one of information indicating a total number of communication nodes or information indicating coverage.

(32)

The apparatus of any of (20) to (31), wherein the circuitry is configured to report information indicating a difference from the first Sharable information.

(33)

The apparatus of any of (20) to (32), wherein the circuitry is configured to:
notify the second frequency usage control system of a discovery signal based on a request signal from the first frequency usage control system; and
notify the first frequency usage control system of information indicating a result of detection of a neighboring node around a communication node managed by the first frequency usage control system, which is detected by the second frequency usage control system.

(34)

The apparatus of (32), wherein the request signal is transmitted based on a result of measurement performed by a communication node managed by the first frequency usage control system or a result of calculation performed by the first frequency usage control system for controlling the communication node.

(35)

The apparatus of any of (20) to (34), wherein the circuitry is configured to notify another frequency usage control system that uses a frequency band associated with the first frequency usage information of information indicating a change in license or priority corresponding to at least a portion of a frequency band used by a communication node managed by the first frequency usage control system.

(36)

The apparatus of any of (20) to (35), wherein the circuitry is configured to notify an external entity monitoring a state of use of frequencies of the first sharable information.

(37)

The apparatus of (36), wherein the circuitry is configured to report the first sharable information at an interval based on a request from the external entity.

(38)

A method including:
acquiring information indicating a result of detection of a communication node managed by a second frequency usage control system; and
notifying the second frequency usage control system of first sharable information generated from first frequency usage information related to a first communication node managed by a first frequency usage control system, wherein the first shamble information is held by a first database included in the first frequency usage control system.

(39)

One or more non-transitory computer readable medium including computer-program instructions, which when executed by circuitry, cause the circuitry to:
acquire information indicating a result of detection of a communication node managed by a second frequency usage control system; and
notify the second frequency usage control system of first shamble information generated from first frequency usage information related to a first communication node managed by a first frequency usage control system, wherein the first shamble information is held by a first database included in the first frequency usage control system.

REFERENCE SIGNS LIST

1 communication system
10 communication control apparatus
110 first communication unit
120 second communication unit
130 processing unit
132 discovery unit
134 information sharing unit
20 GLDB
30 secondary usage node
40 service area

The invention claimed is:

1. An apparatus, comprising:
circuitry configured to
receive a discovery signal from an entity that is external to the apparatus, the discovery signal comprises area information that identifies a target area where discovery of external apparatuses is performed;
determine whether location information associated with an access point in the target area is private;
generate sharable information from frequency usage information recorded by a frequency usage control system based on the discovery signal; and
notify the entity of the sharable information,
wherein, when it is determined that the location information is private, the sharable information does not include the location information,
wherein, when it is determined that the location information is not private, the sharable information includes the location information, and
wherein the location information comprises geo-location information.

2. The apparatus of claim 1, wherein the circuitry generates the sharable information from the frequency usage information related to communication nodes by removing information that is not permitted to be published to the entity.

3. The apparatus of claim 1, wherein:
the discovery signal comprises apparatus ID, profile information indication a profile used in a coexistence system, and the area information.

4. The apparatus of claim 1, wherein the sharable information comprises information that corresponds to a profile which is permissible for being shared in a coexistence system with devices having different profiles.

5. The apparatus of claim 1, wherein the sharable information comprises a total number of secondary systems and a coverage of secondary systems.

6. The apparatus of claim 1, wherein the sharable information comprises information that corresponds to a profile used in a coexistence system.

7. The apparatus of claim 1, wherein the sharable information comprises location information of an access point at a business.

8. The apparatus of claim 1, wherein the sharable information corresponds to a profile used in a second frequency usage control system that is notified of the sharable information.

9. The apparatus of claim 1, wherein the sharable information is published to a second frequency usage control system that is notified of the sharable information.

10. The apparatus of claim 1, wherein the circuitry is configured to generate the sharable information on the basis of the frequency usage information.

11. The apparatus of claim 1, wherein the sharable information is generated by selecting the sharable information from frequency usage information or converting the frequency usage information into the sharable information.

12. The apparatus of claim 1, wherein the sharable information comprises at least one of information indicating a geo-location of a communication node, information indicating a frequency, information indicating transmission power, or information indicating a wireless scheme.

13. The apparatus of claim 12, wherein the sharable information comprises at least one of information indicating a total number of communication nodes or information indicating coverage.

14. The apparatus of claim 1, wherein the circuitry is configured to report information indicating a difference from the sharable information.

15. The apparatus of claim 1, wherein the circuitry is configured to notify the entity while the entity is monitoring a state of use of frequencies of the first sharable information.

16. The apparatus of claim 15, wherein the circuitry is configured to report the sharable information at an interval based on a request from the entity.

17. A method comprising:
receiving a discovery signal from an entity that is external to an apparatus, the discovery signal comprises area information that identifies a target area where discovery of external apparatuses is performed;
determining whether location information associated with an access point in the target area is private;
generating sharable information from frequency usage information recorded by a frequency usage control system based on the discovery signal; and
notifying the entity of the sharable information,
wherein, when it is determined that the location information is private, the sharable information does not include the location information,
wherein, when it is determined that the location information is not private, the sharable information includes the location information, and
wherein the location information comprises geo-location information.

18. One or more non-transitory computer readable medium including computer-program instructions, which when executed by circuitry, cause the circuitry to:
receive a discovery signal from an entity that is external to an apparatus, the discovery signal comprises area information that identifies a target area where discovery of external apparatuses is performed;
determine whether location information associated with an access point in the target area is private;
generate sharable information from frequency usage information recorded by a frequency usage control system based on the discovery signal; and
notify the entity of the sharable information,
wherein, when it is determined that the location information is private, the sharable information does not include the location information,
wherein, when it is determined that the location information is not private, the sharable information includes the location information, and
wherein the location information comprises geo-location information.

19. The apparatus of claim 1, wherein the circuitry is further configured to:
store the location information.

20. The apparatus of claim 1, wherein the determination of whether the location information associated with the access point in the target area is private is made using a flag received in the discovery signal.

* * * * *